(12) United States Patent
Bhethanabotla et al.

(10) Patent No.: US 12,050,343 B2
(45) Date of Patent: Jul. 30, 2024

(54) SMALL DIAMETER POLYMER OPTICAL WAVEGUIDE

(71) Applicant: University of South Florida, Tampa, FL (US)

(72) Inventors: Venkat Rama Bhethanabotla, Tampa, FL (US); Thomas M. Weller, Corvallis, OR (US); Roger Brandon Tipton, Wesley Chapel, FL (US); John Townsend Bentley, Tampa, FL (US); Eduardo Antonio Rojas, Port Orange, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 17/982,907

(22) Filed: Nov. 8, 2022

(65) Prior Publication Data

US 2024/0151902 A1 May 9, 2024

Related U.S. Application Data

(60) Division of application No. 17/022,842, filed on Sep. 16, 2020, now Pat. No. 11,561,343, which is a
(Continued)

(51) Int. Cl.
*G02B 6/122* (2006.01)
*B29C 64/118* (2017.01)
*B29K 101/12* (2006.01)
*B33Y 10/00* (2015.01)
*G02B 6/138* (2006.01)

(52) U.S. Cl.
CPC .......... *G02B 6/1221* (2013.01); *B29C 64/118* (2017.08); *B33Y 10/00* (2014.12); *G02B 6/138* (2013.01); *B29K 2101/12* (2013.01)

(58) Field of Classification Search
CPC ... G02B 6/1221; B29C 33/405; B29C 39/026; B29C 39/42; B29C 2035/0827; B29C 35/0805; B29C 37/005
See application file for complete search history.

(56) References Cited

U.S. PATENT DOCUMENTS 7,604,758 B2 * 10/2009 Akutsu ............... B29C 35/0888
264/225
8,195,023 B1 * 6/2012 Jacobsen ................. G02B 6/10
385/129

(Continued)

*Primary Examiner* — Ryan A Lepisto
*Assistant Examiner* — Erin D Chiem
(74) *Attorney, Agent, or Firm* — Michele L. Lawson; Smith & Hopen, P.A.

(57) ABSTRACT

A novel polymer optical waveguide and method of manufacturing is presented herein. A digitally manufactured process is described which utilizes a micro-dispensed UV optical adhesive as the contour guiding cladding, a fused deposition modeling technology for creating a core, and a subtractive laser process to finish the two ends of the optical interconnect. The optical waveguide can be printed directly on a circuit board in some embodiments. Alternatively, using a slightly modified process including a step to bond the optical fiber to the substrate, the optical interconnect can be manufactured on a flexible substrate.

14 Claims, 27 Drawing Sheets
(26 of 27 Drawing Sheet(s) Filed in Color)

Related U.S. Application Data continuation-in-part of application No. 16/138,558, filed on Sep. 21, 2018, now Pat. No. 10,852,479.

(60) Provisional application No. 62/561,505, filed on Sep. 21, 2017, provisional application No. 62/901,063, filed on Sep. 16, 2019.

(56) References Cited

U.S. PATENT DOCUMENTS

| | | | |
|---|---|---|---|
| 10,408,997 B1* | 9/2019 | Eckel | G02B 6/12002 |
| 2004/0126694 A1* | 7/2004 | Devoe | B29C 64/135 |
| | | | 430/321 |
| 2015/0078712 A1* | 3/2015 | Brunner | G02B 6/4219 |
| | | | 264/1.24 |
| 2016/0356971 A1* | 12/2016 | de Jong | B29C 64/135 |

* cited by examiner

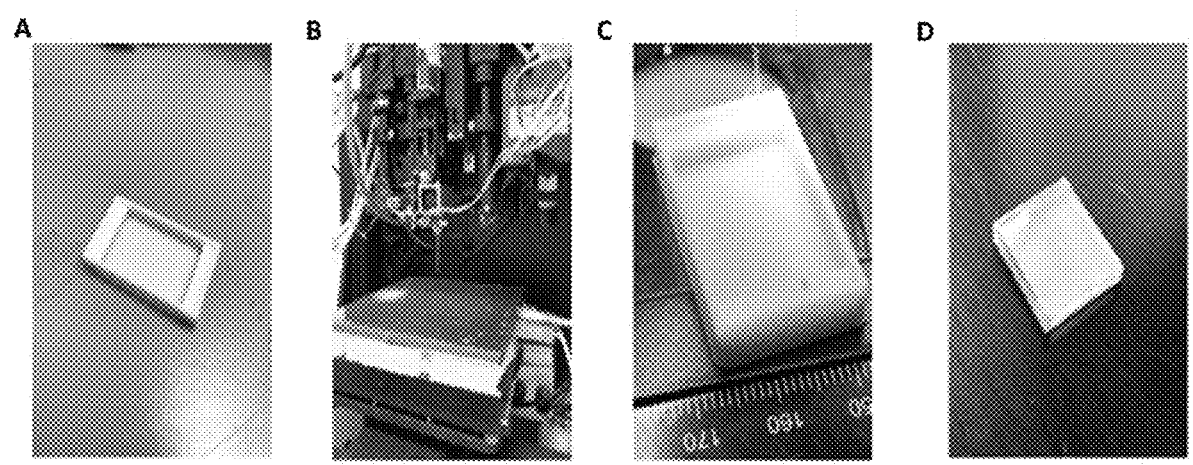
FIG. 1A-D

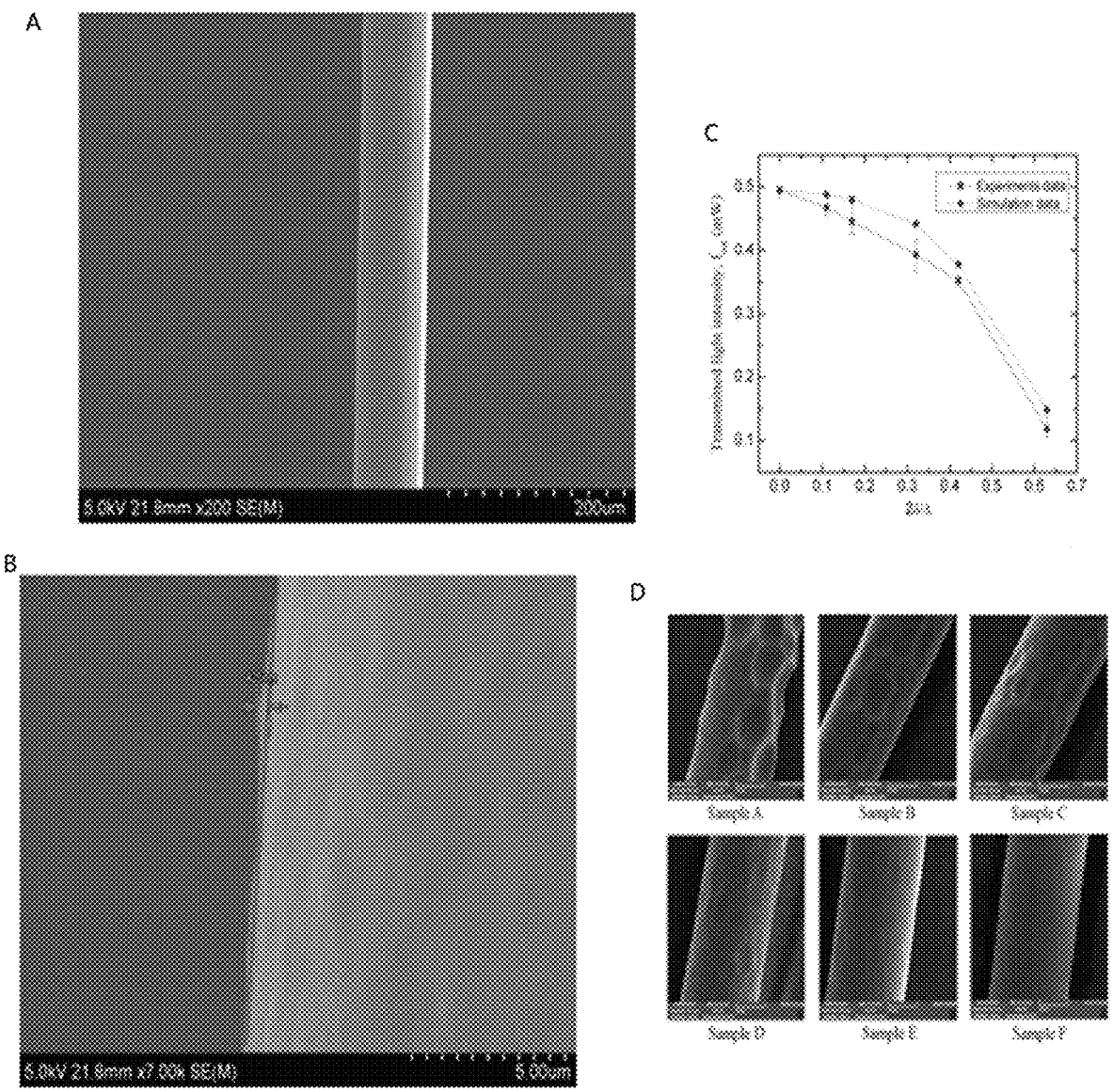
FIG. 3A-D

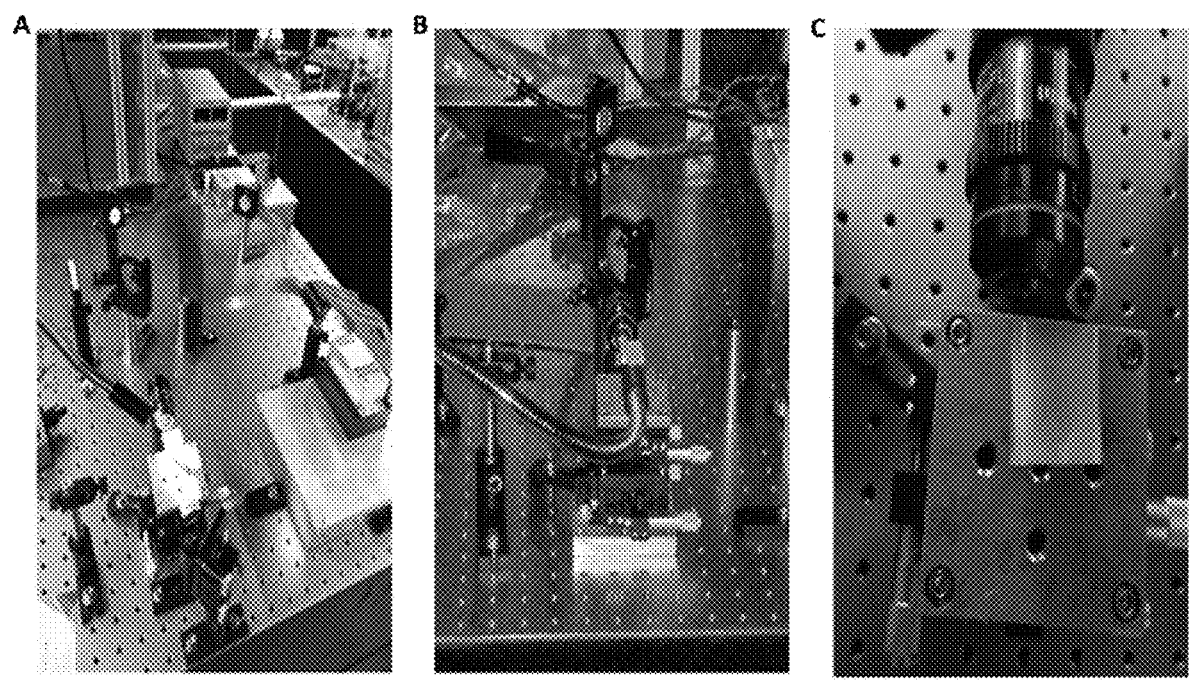
FIG. 4A-C

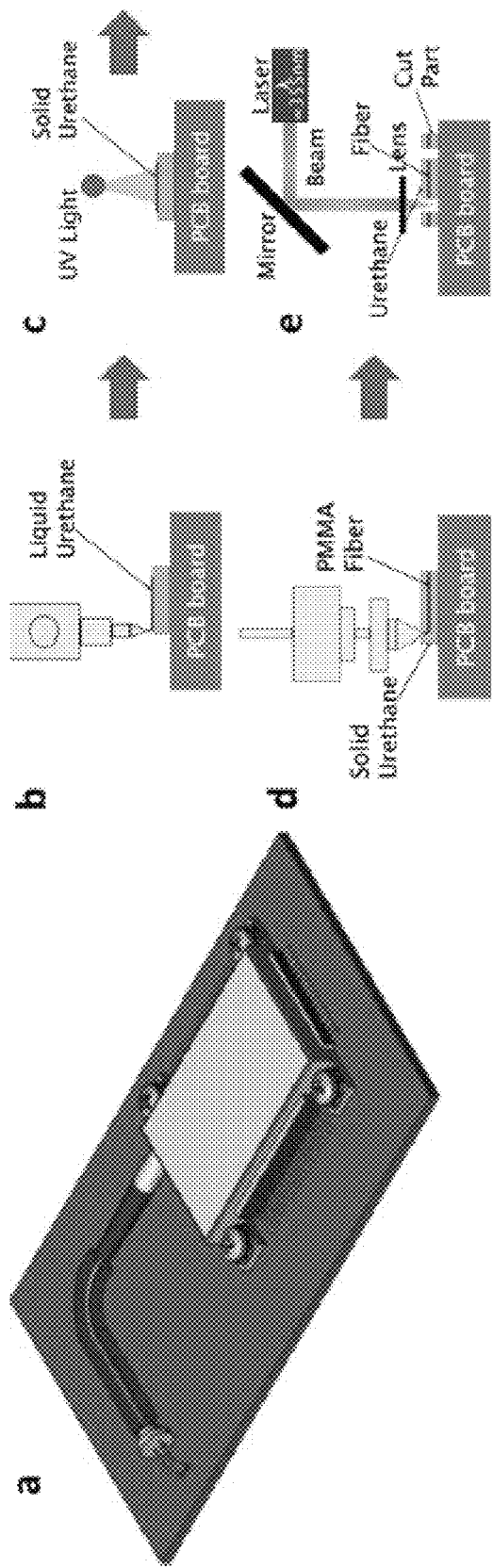
FIG. 5A-E

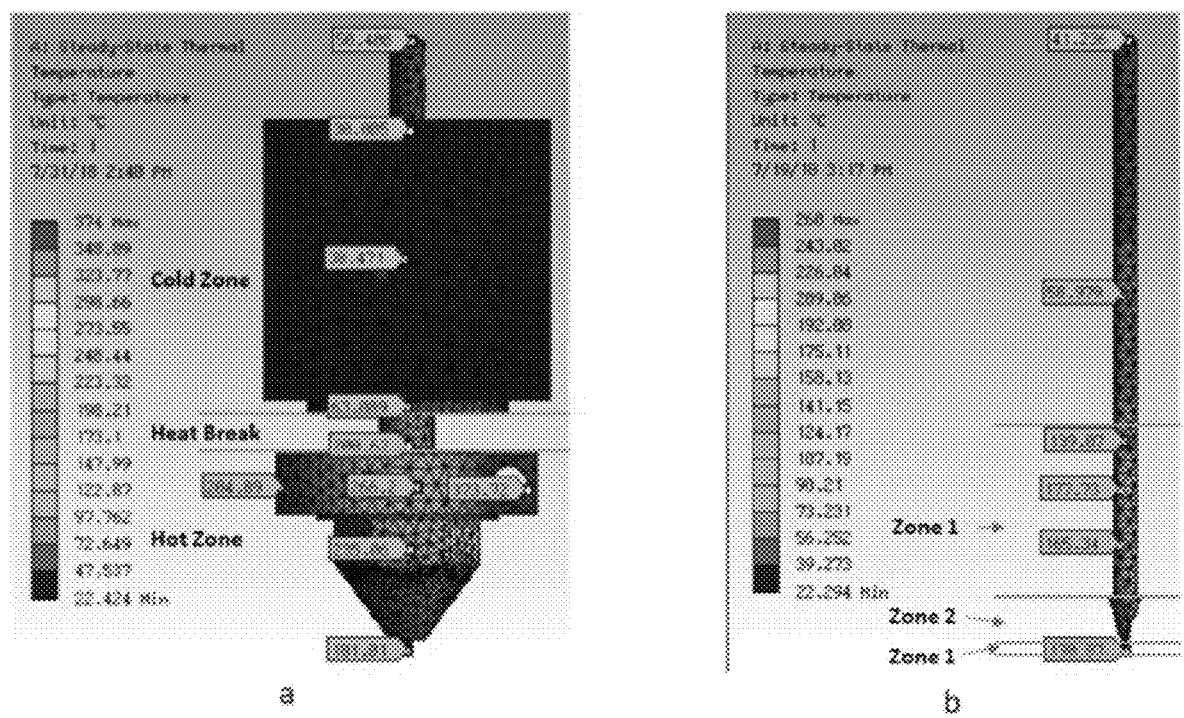
FIG. 8A-B

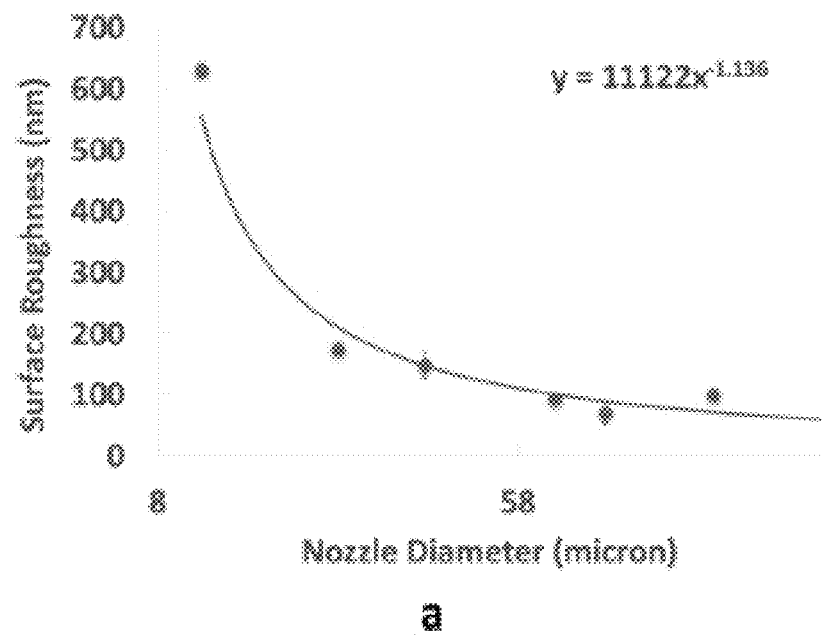
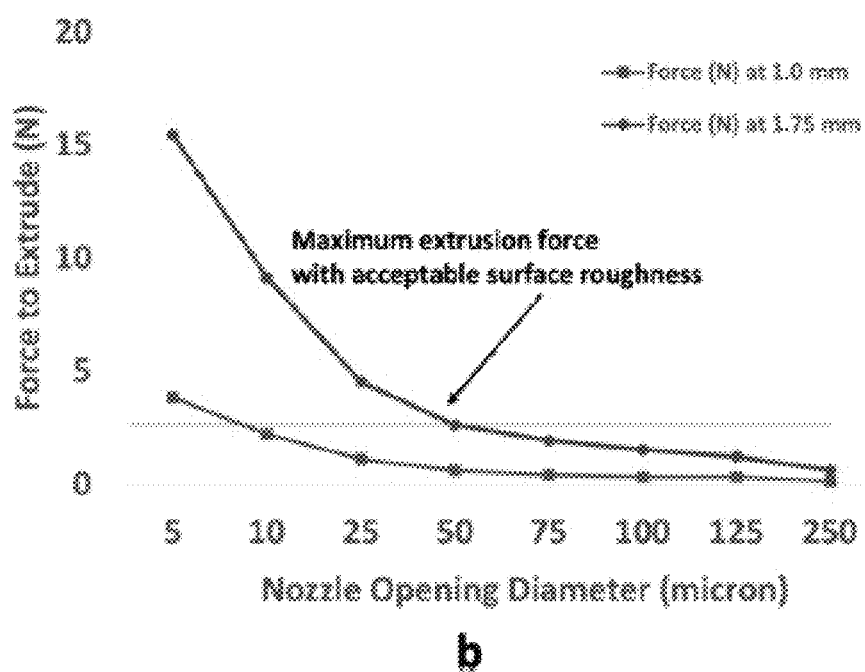
FIG. 9A-B

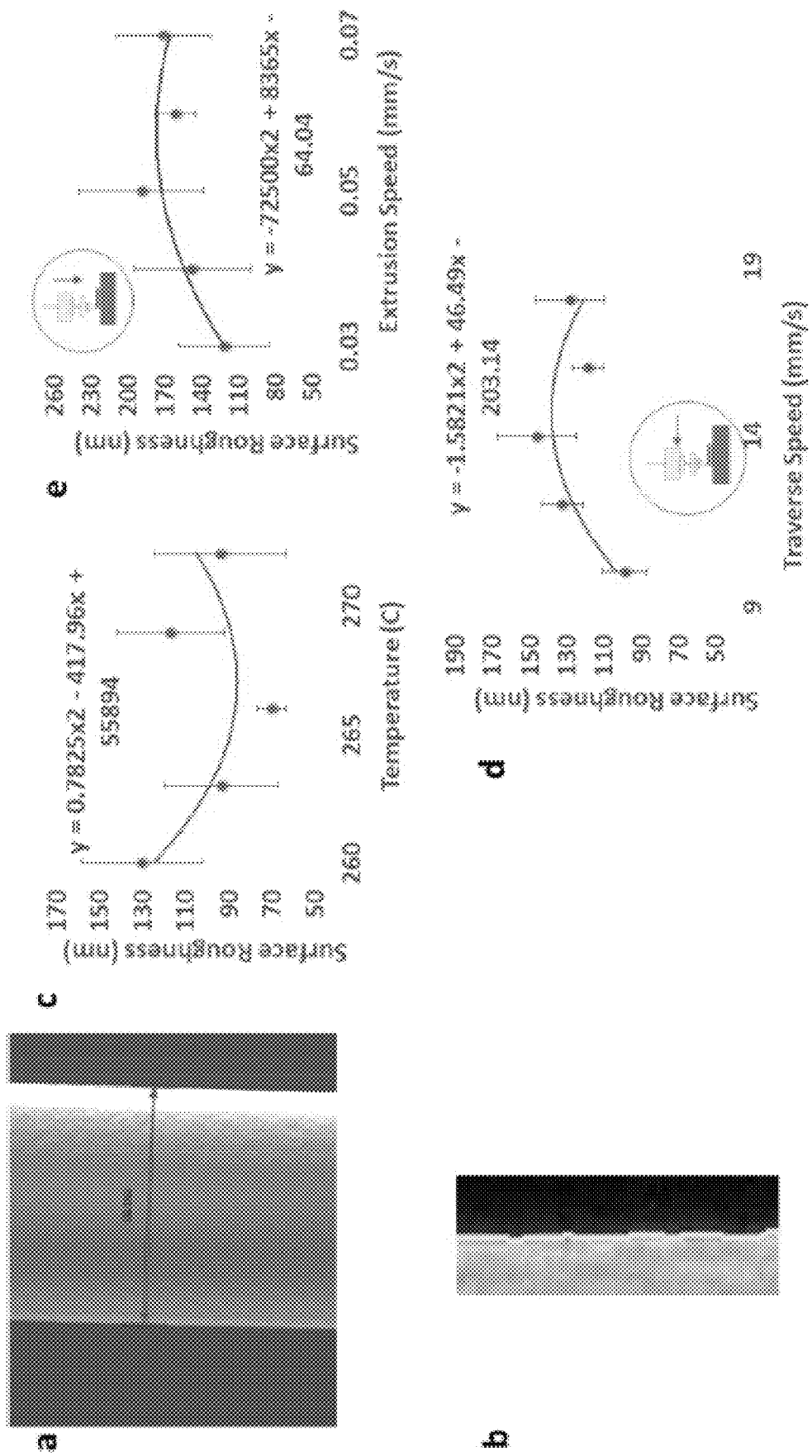
FIG. 10A-E

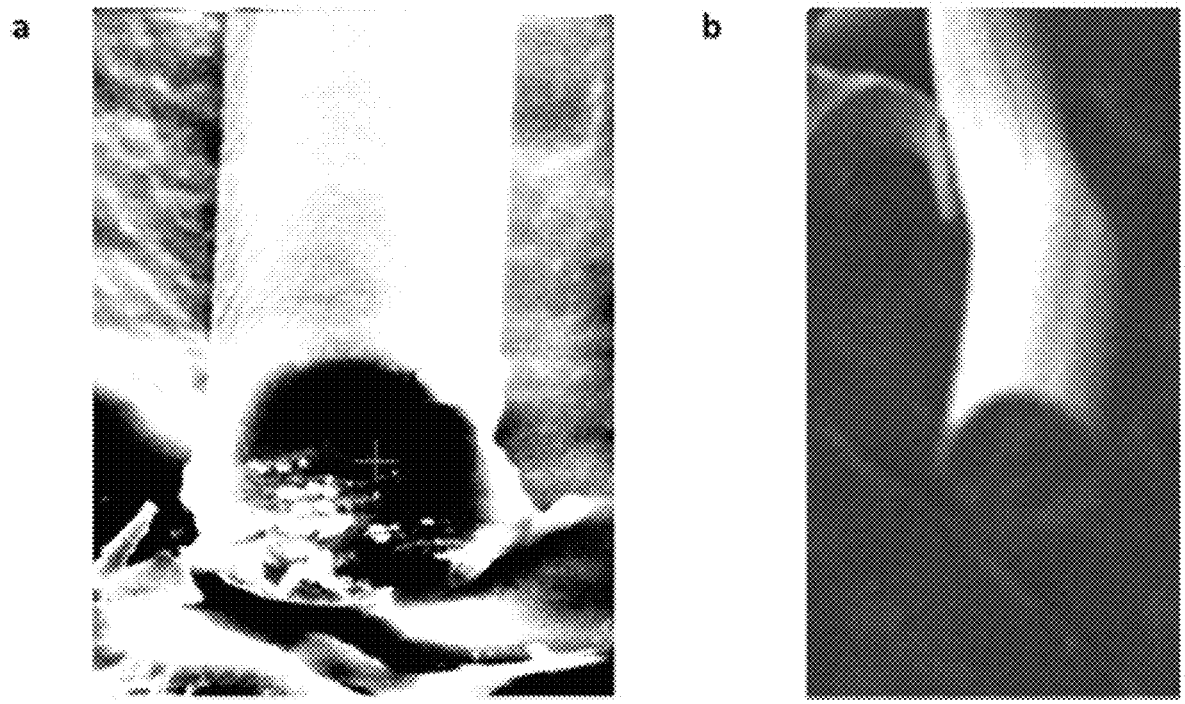
FIG. 11A-B
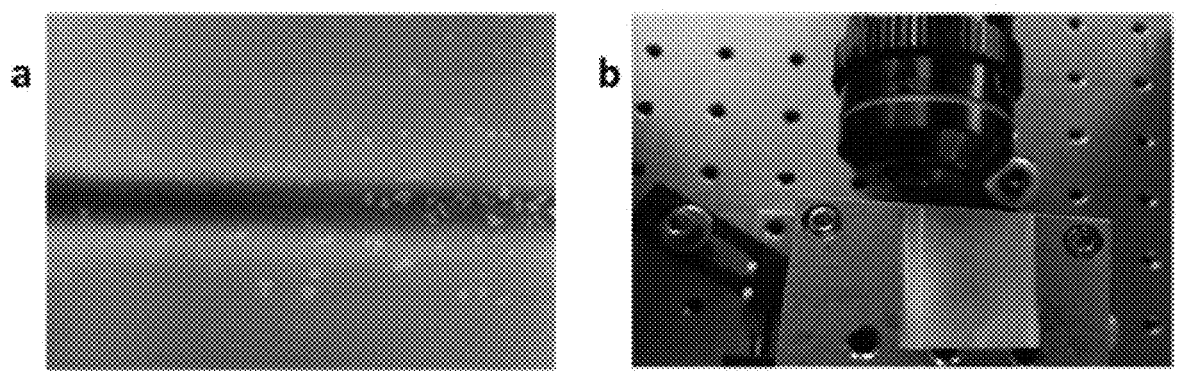
FIG. 12A-B

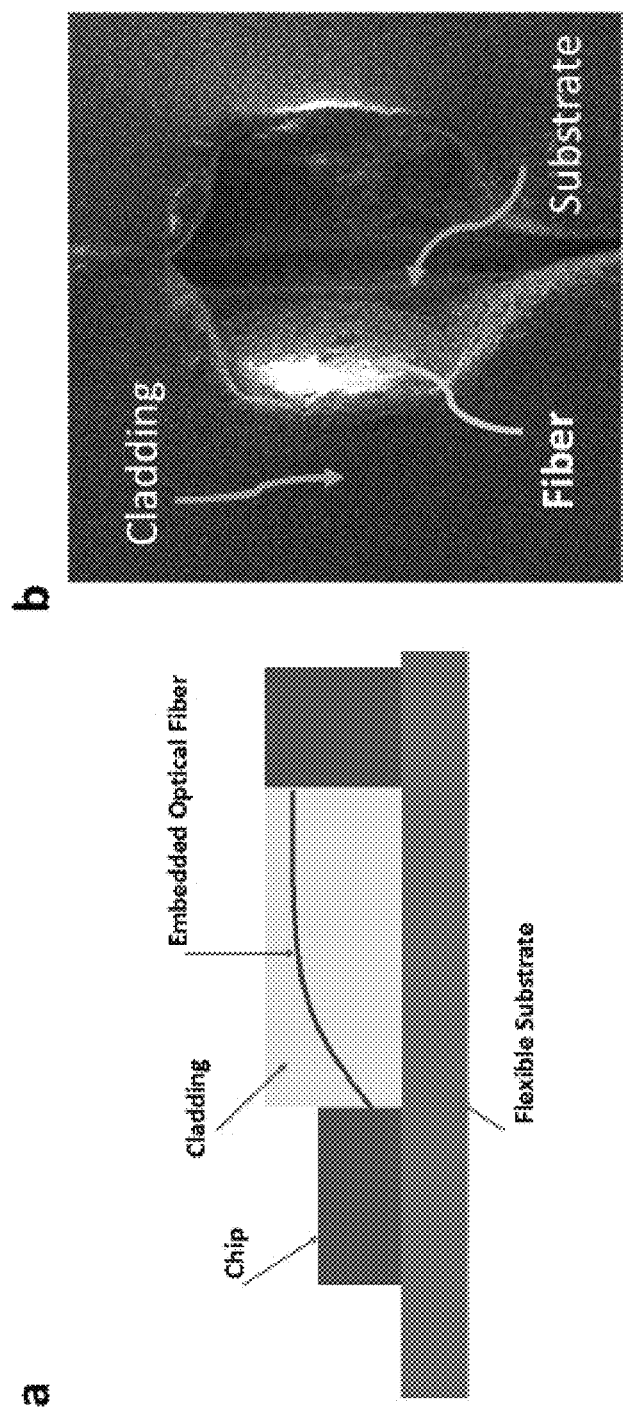
FIG. 13A-B

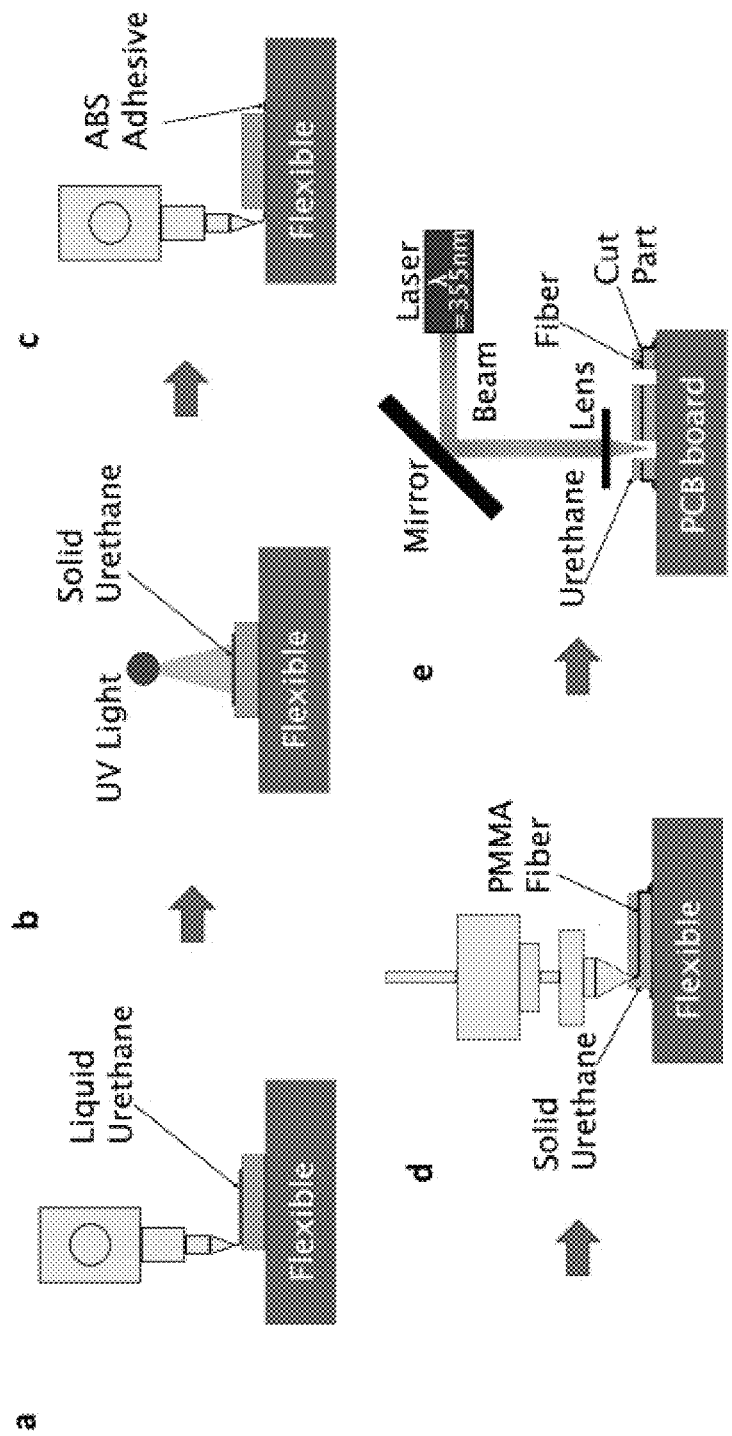
FIG. 14A-E

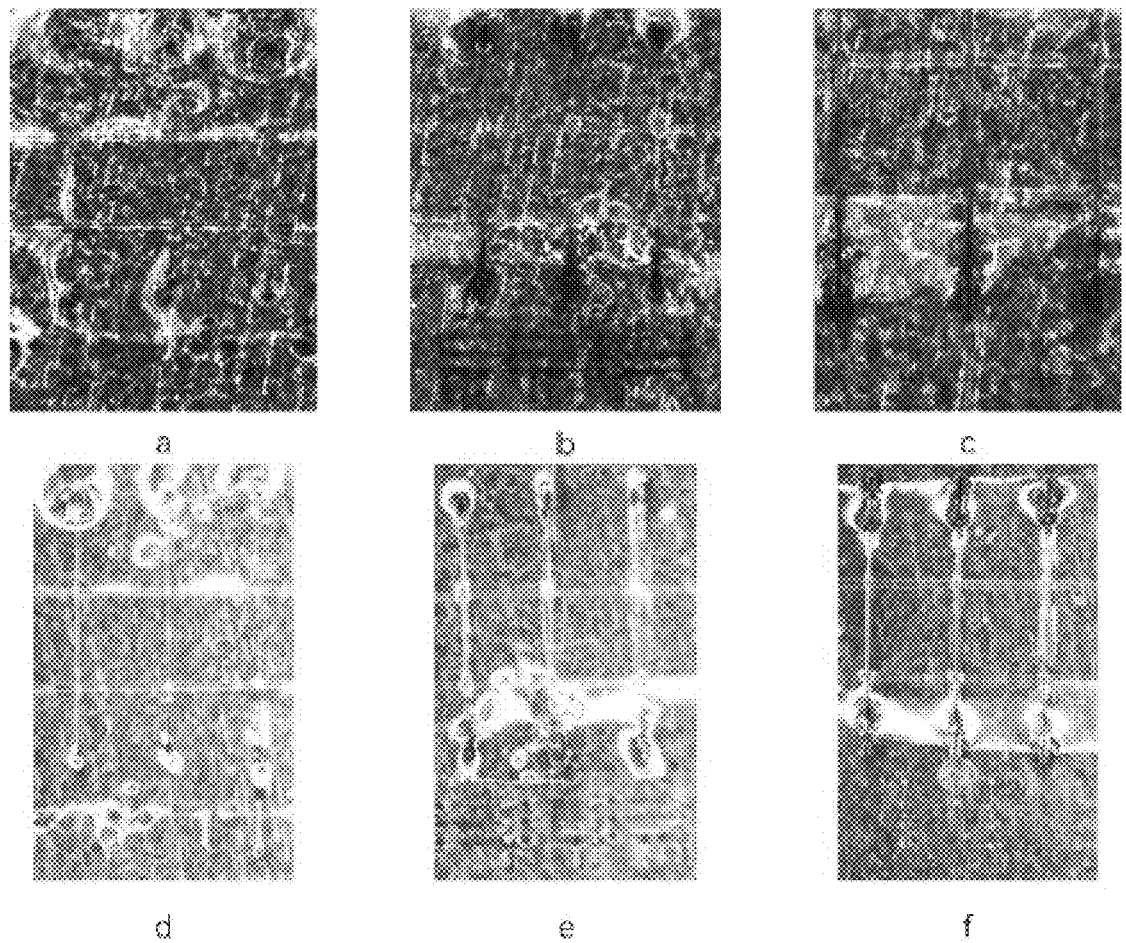
FIG. 16A-F

FIG. 17A-C

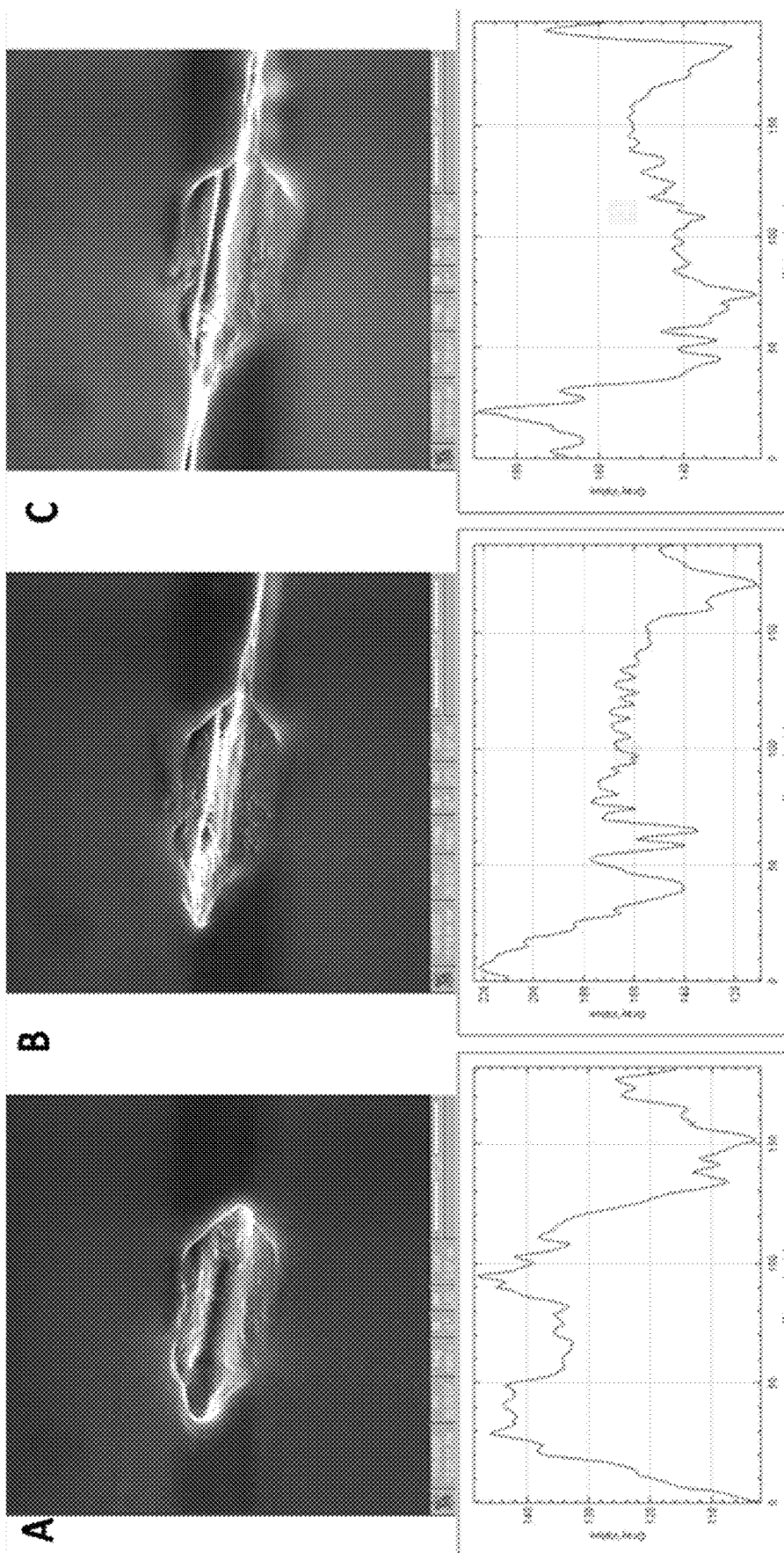
FIG. 18A-C

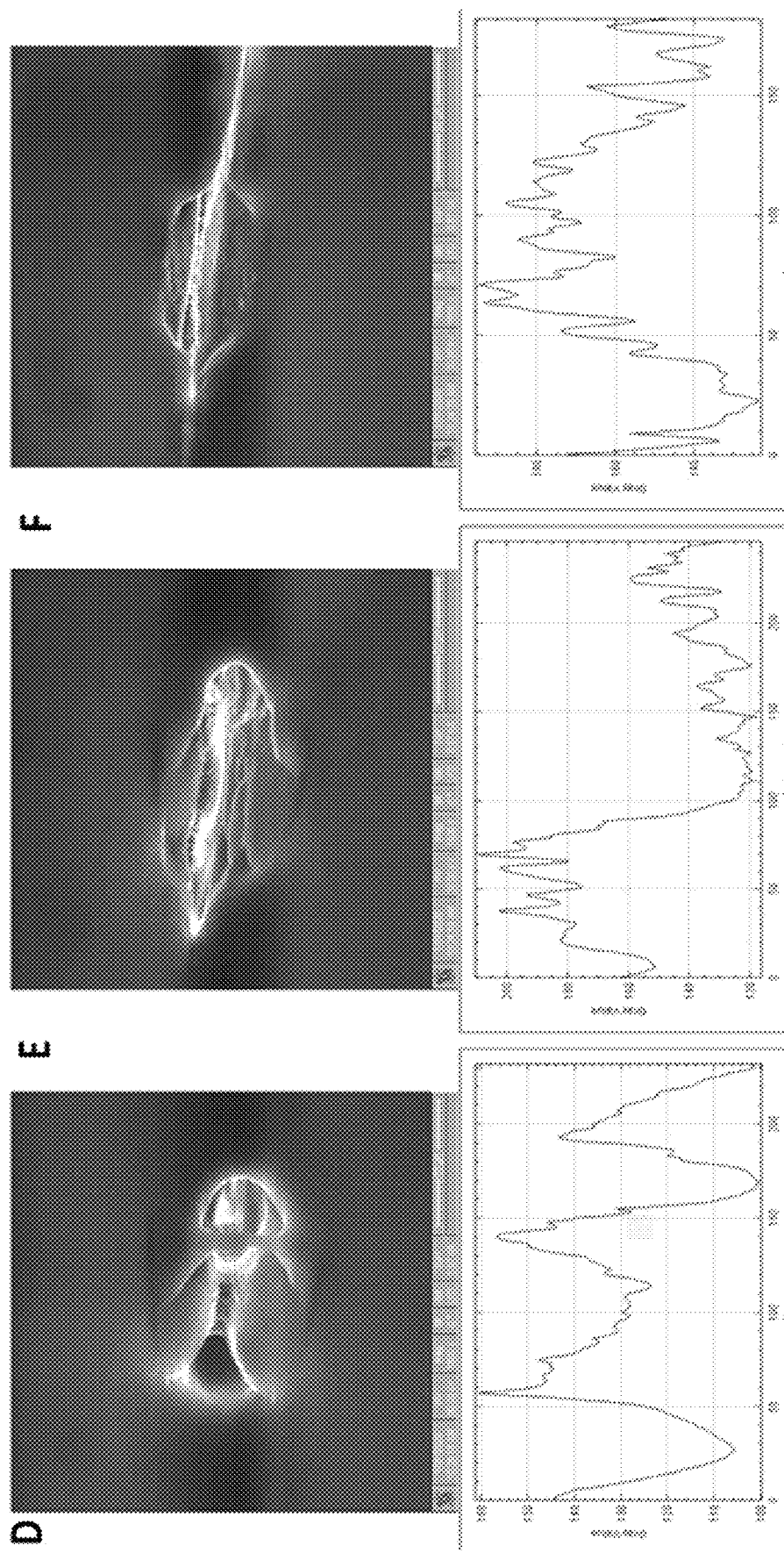
FIG. 18D-F

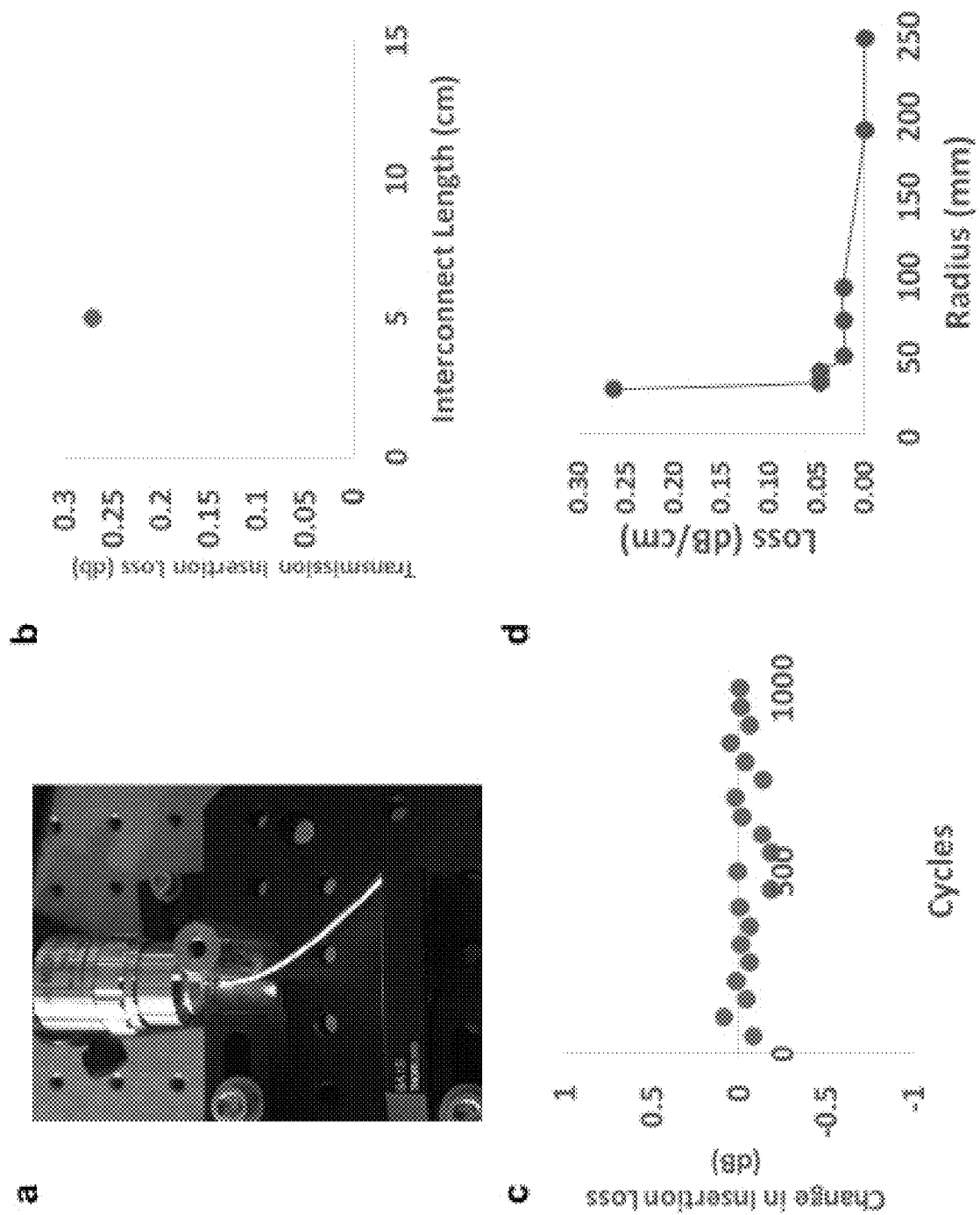
FIG. 22A-D

SMALL DIAMETER POLYMER OPTICAL WAVEGUIDE

CROSS REFERENCE TO RELATED APPLICATIONS

This application is divisional of and claims priority to currently U.S. Nonprovisional patent application Ser. No. 17/022,842, "Digital Fabrication of a Small Diameter Polymer Optical Waveguide", filed Sep. 16, 2020 which is a continuation in part of and claims priority to U.S. Nonprovisional application Ser. No. 16/138,558, now U.S. Pat. No. 10,852,479, entitled "Digital Fabrication of a Small Diameter Polymer Optical Waveguide", filed Sep. 21, 2018 which is a nonprovisional of and claims priority to U.S. Provisional Patent Application Ser. No. 62/561,505, entitled "Digital Fabrication of a Small Diameter Polymer Optical Waveguide", filed Sep. 21, 2017, the contents of each of which are hereby incorporated by reference into this disclosure. This application also claims the benefit of priority to U.S. Provisional Patent Application Ser. No. 62/901,063, entitled "Embedding of Additive Manufactured Optical Fibers into and Optical Cladding Material to Promote Round Fibers through Homogenous Cooling", filed Sep. 16, 2019, the contents of which are hereby incorporated by reference into this disclosure.

GOVERNMENTAL SUPPORT

This invention was made with government support under Grant No. NNX15AI10H awarded by the National Aeronautics and Space Administration (NASA). The government has certain rights in the invention.

FIELD OF INVENTION

This invention relates to optical interconnects. Specifically, the invention provides novel plastic optical waveguides and a novel process for manufacture both directly on printed circuit boards and on flexible substrates.

BACKGROUND OF THE INVENTION

Interconnects are currently metal conductors and the amount of information that can be transferred is limited.

Electrical Interconnects Signal attenuation is one of the largest issues of electrical interconnects due to resistance of the conductor and electric loss. These issues can be magnified at higher frequencies. Complex systems can be created to account for this with equalization and amplification up to the physical noise limitations.

One way to improve the performance of a conductor is to increase its cross-sectional area, which reduces the resistance. The downside to this is that the cost and physical size requirements of the conductor are increased which can limit the applications for this solution.

If size constraints are important, simply scaling the conductor down does not increase the bit rate capacity of the line due to the resistance x capacitance time constant of the wire which sets the shortest pulse that could readily be sent on the line. This makes the information carrying capacity of the electrical conductor independent of the size of the line. To better explain this, there are two types of electrical wiring, resistive capacitive (RC) and inductive capacitive (LC). Whether a line is RC or LC at a given frequency is primarily determined by its cross-sectional size which determines whether resistive (limited by the bulk resistance of the metal) or inductive (crowding of the current towards the surface of the wire) impedance dominates at a given frequency. At the gigahertz frequencies of modern electronics, interconnected lines on chips are RC controlled and off chip is LC controlled. (Kobrinsky, M. J. et al. On-Chip Optical Interconnects. *Intel Technology Journal* 8, 129-141 (2004); Miller, D. A. B. Optical interconnects to electronic chips. *Appl. Opt.* 49, F59-F70, (2010)).

The capacity of electrical lines from such resistive limits can be written approximately as:

$$B \leq B_0 \frac{A}{L^2}$$

Where A is the cross-sectional area of the conductor, L is the length of the conductor, $B_0$ is a constant and is approximately $10^{16}$ for RC-limited lines on a chip and approximately $10^{17}$ for inductive capacitive lines with resistive loss for off-chip equalized RLC lines.

Another important consideration is that the overall energy consumption of computer systems is becoming ecologically significant and optical interconnects can help reduce this power consumption. The three main core operations of a computer system are logic switching, memory and interconnects where the interconnects amount for the highest energy dissipation. (Miller, D. A. B. Optical interconnects to electronic chips. *Appl. Opt.* 49, F59-F70, (2010)).

Optical Interconnects

When investigating other options to solve the problem of limited high frequency data transmission, optics is arguably the best option moving forward. In optical interconnects, the very low loss and dispersion of optical fiber allows for a much higher rate of information transmission. At short distances, optics can assist in interconnect density and interconnect power as well as improve signal integrity and timing. (Keeler, G. A. et al. The benefits of ultrashort optical pulses in optically interconnected systems. *IEEE Journal of Selected Topics in Quantum Electronics* 9, 477-485, (2003); Kuan-Neng, C., Kobrinsky, M. J., Barnett, B. C. & Reif, R. Comparisons of conventional, 3-D, optical, and RF interconnects for on-chip clock distribution. *IEEE Transactions on Electron Devices* 51, 233-239, (2004); Miller, D. A. B. & Ozaktas, H. M. Limit to the Bit-Rate Capacity of Electrical Interconnects from the Aspect Ratio of the System Architecture. *Journal of Parallel and Distributed Computing* 41, 42-52).

Light rays propagate via discreate paths through a fiber where each path is called a mode and corresponds to an angle of incidence. Different modes take different times to travel along the fiber. The total number of modes is defined by the numerical aperture which is given by:

$$NA = (n_1^2 - n_2^2)^{1/2} = n_0 \sin\left(\frac{\theta_a}{2}\right)$$

Where $n_0$=refractive index of the air, $n_1$=refractive index of the core, and $n_2$ is the refractive index of the cladding. The larger the difference in refractive index, the higher the number of modes which can be guided through the fiber. With a step index fiber, the number of possible modes N m is related by:

$$N_m = 0.5 \left(\frac{\pi d NA}{\lambda}\right)^2$$

Where d is the diameter of the fiber and 2 is the wavelength of the light used. With these constraints in mind, a larger diameter fiber with larger delta n, and a lower wavelength light will lead to a fiber that transmits more information. (P.V. Thorat, S. W., P. A. Thombre. Plastic Optical Fiber. *International Journal of Engineering Research and Reviews* 2, 95-104 (2014)).

New optical interconnects are an interesting option but have fabrication and design related issues: (1) how to route optics through tight spaces without high losses due to scattering; (2) how to connect optics to light generating sources; and (3) how to increase the delta n and reduce the wavelength to increase the number of modes.

Additive Manufacturing

Three-dimensional (3D) printing, also known as additive manufacturing, can be used to make a product in a consecutive layering sequence. Highly complex and precise structures which are difficult to produce by conventional methods, can be easily produced using additive manufacturing technologies. The predefined user design in 3D printing techniques has shortened the manufacturing time with respect to a variety of materials. For a large amount of different input material, commonly, 3D printing can be classified into solid, liquid and powder-based techniques. Solid-based techniques are comprised of Fused Deposition Modeling (FDM), liquid-based techniques are comprised of stereolithography (SLA), Digital Light Processing (DLP), and Direct Ink Writing (DIW), and powder-based techniques are comprised of Selective Laser Sintering (SLS), and Selective Laser Melting (SLM). (N. Mohan, P. Senthil, S. Vinodh, N. Jayanth, "A review on composite materials and process parameters optimization for the fused deposition modeling process," Virtual and Physical Prototyping, Vol. 12, No. 1, 2017).

FDM has several advantages including low cost for set up and maintenance, ease of use, and ease in design. Precise control over the temperature systems effectively protects the solidified layers from impairment by the temperature fluctuation during solidification. Without this precise control over the temperature systems, delamination with the neighboring printed layers may occur which can lead to unexpected porosity and a rapid decrease in mechanical strength. The mechanical properties of the final print are a function of the interface between the print layers, which is a function of interaction, thickness, and gap, etc. The surface quality and appearance of the product is highly determined by the printing parameters including printing speed, extrusion speed, nozzle temperature and work platform temperature, etc.

In general, for the FDM process, filaments should be thermoplastics with polymer chains that can be mobilized easily on heating above their glass transition temperature (Tg) or composite materials. ABS (Acrylonitrile Butadiene Styrene), PA (Polyamide) and PC (Polycarbonate) are the most commonly used feedstock due to their lower costs. Filaments are supplied to the heater (liquefier) by two rollers. The filaments become semi-molten within the liquefier and are subsequently extruded out from a nozzle connected to the liquefier as more and more semi-liquid feedstock accumulate inside. The work platform is preheated to the proper temperature for targeted feedstock. During the printing process, it is moved following a pre-programmed script which can be derived from tomography scans, magnetic resonance imaging scans, or CAD model data. The feedstock from the nozzle is deposited onto the top surface of the aimed area. The layer by layer construction is achieved by movement of the module along the Z direction.

Additive Manufacturing for Waveguides

Circular plastic optical fibers that are produced using additive manufacturing have the ability to improve upon the performance of metallic interconnects and the current state of the art in optical interconnects. The state of the art in optical interconnects includes patch cable type interconnects, integrated circuit (IC) manufactured silicon rectangular waveguides, and liquid/liquid micro-dispensed optical interconnects. Patch cable polymer optical fiber interconnects are manufactured by extruding polymer pellets through a heated die and then rolled on spools. The fibers are then jacketed, and the fiber ends are processed to include connectors. To apply these fibers to circuit boards for the next generation of computer devices with this spooled product technology, fibers are assembled into cables and the cables are then manually connected to the components on the board. This results in extremely fast data transmission rates, but the fibers are of a large size and require significant time to assemble, are difficult to align, too large for standard packaging, relatively expensive, and not scalable to high volume production.

Rectangular silicon waveguides are an interesting alternative to fiber cable technology. IC processes are used to fabricate on-board single mode rectangular silicon waveguides that operate in the longer wavelengths of 1300 nm or 1500 nm where Si is transparent, and use continuous wave telecommunications single-mode lasers. (D.A.B. Miller, Optical interconnects to electronic chips, Applied Optics 49 (25) (2010) F59—F70; C. Baks, D. M. et al., Dense 24 TX+24 RX fiber-coupled optical module based on a holey CMOS transceiver, Proceedings 60th Electronic Components and Technology Conference (ECTC) (2010); Jun Su Lee, et al., Meeting the Electrical, Optical, and Thermal Design Challenges of Photonic-Packaging, IEEE JOURNAL OF SELECTED TOPICS IN QUANTUM ELECTRONICS 22 (6) (2016); D. A. Miller, Device requirements for optical interconnects to silicon chips, Proceedings of the IEEE 97 (7) (2009) 1166-1185; M. Zuffada, The industrialization of the silicon photonics: technology road map and applications in 2012, Proceedings of the ESSCIRC (ESSCIRC), IEEE, 2012). These rectangular waveguides are fabricated in two dimensions and complex mirror and lens systems are required if a z-direction change is required. Optical losses are also created when connecting rectangular fibers to circular cross section (CCS) fibers. The current state of the art also includes a new micro-dispensing only technique, where an optical fluid material is micro-dispensed inside another optical material and UV cured to produce a working fiber. (Yasuhara, K., F. Yu, and T. Ishigure, *Circular core single-mode polymer optical wave guide fabricated using the Mosquito method with low loss at* 1310/1550 *nm*. Optics Express, 2017. 25(8): p. 8524-8533).

Although functional products could be created by each of these methods, each presents disadvantages that prevent advancement of these techniques to commercial levels. Current chip to chip technology has not been able to overcome the problem of how to densely route 3-dimensional optical interconnects through tight spaces without losses due to scattering; how to easily connect optical interconnects to devices; how to take advantage of less expensive and lower wavelength multimode vertical-cavity surface-emitting laser diodes (VCSEL); and how to do the foregoing in cost effective packages.

Flexible Optoelectronic Devices

Interest continues to grow in developing new materials and processes that allow for the development of flexible optoelectronic devices that can be efficiently fabricated on flexible substrates. (Someya, T., Bao, Z. & Malliaras, G. G. The rise of plastic bioelectronics. *Nature* vol. 540 379-385 (2016); Zardetto, V., Brown, T. M., Reale, A. & Di Carlo, A. Substrates for flexible electronics: A practical investigation on the electrical, film flexibility, optical, temperature, and solvent resistance properties. *J. Polym. Sci. Part B Polym. Phys.* 49, 638-648 (2011); Ahn, J. H. et al. Heterogeneous three-dimensional electronics by use of printed semiconductor nanomaterials. Science, 314, 1754-1757 (2006)). Flexible photonics must be able to maintain their optical performance while being mechanically deformed through bending, folding, rolling, twisting, stretching or compression. (Qiang, Z. et al. Fano filters based on transferred silicon nanomembranes on plastic substrates. *Appl. Phys. Lett.* 93, 061106 (2008)). This flexible capability enables the development of new devices such as flexible imaging, optical interconnects, solar cells, and sensors. (Zhou, L. et al. All-organic active matrix flexible display. *Appl. Phys. Lett.* 88, 083502 (2006); Bosnian, E. et al. Highly reliable flexible active optical links. *IEEE Photonics Technol. Lett.* 22, 287-289 (2010); Guidotti, D., Yu, J., Blaser, M., Grundlehner, V. & Chang, G. K. Edge viewing photodetectors for strictly in-plane lightwave circuit integration and flexible optical interconnects. in *Proceedings—Electronic Components and Technology Conference* vol. 2006 782-788 (2006); Shibata, T. & Takahashi, A. Flexible opto-electronic circuit board for in-device interconnection. in *Proceedings—Electronic Components and Technology Conference* 261-267 (2008); Swatowski, B. W. et al. Flexible, stable, and easily processable optical silicones for low loss polymer waveguides. in *Organic Photonic Materials and Devices* XV (eds. Tabor, C. E., Kajzar, F., Kaino, T. & Koike, Y.) vol. 8622 862205 (SPIE, 2013); Yoon, J. et al. Ultrathin silicon solar microcells for semitransparent, mechanically flexible andmicroconcentrator module designs. in *Materials for Sustainable Energy: A Collection of Peer-Reviewed Research and Review Articles from Nature Publishing Group* 38-46 (World Scientific Publishing Co., 2010)). There are numerous advantages to using flexible optoelectronics in that they can be used as a foil over irregular surfaces for distributed sensing applications, used on movable surfaces in robotics, or folded into compact modules for portable devices. This capability along with packaging improvements due to significantly lower overall thickness, weight, and compactness of products can lead to the development of exciting new devices. (Bosnian, E. et al. Highly reliable flexible active optical links. *IEEE Photonics Technol. Lett.* 22, 287-289 (2010); Fjelstad, J. Flexible circuit technology. (2007)

Several new technologies are currently being used to fabricate flexible optoelectronic devices. They are typically fabricated using one of the two main categories of non-contact printing and contact printing of solutions on flexible substrates. Non-contact printing includes screen printing, inkjet printing, and slot-die printing. In non-contact printing the inks are dispensed through openings and structures are defined by moving the substrate in a preprogramed pattern. The more common methods are contact printing types which include gravure, offset, flexography, micro-contact, nano-imprinting and dry transfer printing. In contact printing the structures with inks are brought into contact with the substrates. (Shibata, T. & Takahashi, A. Flexible opto-electronic circuit board for in-device interconnection. in *Proceedings—Electronic Components and Technology Conference* 261-267 (2008)). While each of these techniques have advantages, a major disadvantage is that mirrors or other optical devices are required to change the direction of the light rays out of the plane of the substrate to connect with components. (Khan, S., Lorenzelli, L. & Dahiya, R. S. Screen printed flexible pressure sensors skin. in *ASMC (Advanced Semiconductor Manufacturing Conference) Proceedings* 219-224 (Institute of Electrical and Electronics Engineers Inc., 2014); Li, L. et al. A fully-integrated flexible photonic platform for chip-to-chip optical interconnects; Dangel, R., Horst, F., Jubin, D., . . . N. M.-J. of lightwave & 2013, undefined. Development of versatile polymer waveguide flex technology for use in optical interconnects; Choi, C. et al. Flexible optical waveguide film with 45-degree micromirror couplers for hybrid E/O integration or parallel optical interconnection. in *Photonics Packaging and Integration IV* vol. 5358 122 (SPIE, 2004).

Integrated photonics have many compelling advantages for computing and communication applications, including high-speed and extremely wide bandwidth operation. Current systems are typically hybrid assemblies of packaged photonic devices where printed circuit boards often serve to route electrical signals and power, and in some cases, have runs of optical fibers. Development of a hybrid assembly method of optical interconnects for photonic systems would allow for higher transmission rates, lower power requirements, improved signal integrity and timing, less heat generation, and improved security of communication signals.

Given the shortcomings of the prior art, what is needed is an additive manufactured plastic optical interconnect that can be inexpensively mass produced can improve data transmission rates for a wide range of devices.

SUMMARY OF INVENTION

When fused deposition modeling (FUM) printing optical fibers on a surface, the fiber is not round but rather flat on the bottom due to non-uniform cooling of the fiber. When fibers are embedded in an optical cladding material, the cooling is uniform, and the fiber is round thus eliminating one of the barriers of using optical fibers in printed circuit board optical interconnect applications. The instant invention uses a hot FDM printer nozzle to embed optical fibers into an optical cladding material.

The inventors show that by using a new process based on laser enhanced direct print additive manufacturing process of fused deposition modeling (FDM) of plastic, micro-dispensing of rubber like materials, and picosecond laser subtraction that single and multi-mode optical fibers can be fabricated in a controlled manner such that compact, 3-dimensional optical interconnects that can be printed along non-lineal paths. The inventors have produced working optical interconnects with fiber core diameters from 70-μm to as small as 12-μm. The results demonstrate surface roughness in 3D printed 70-μm optical fibers of less than 100 nm and optical transmission rates above 46% (or 63% that of a commercial fiber), for proof of concept devices.

The proposed technique can be applied to various board to board or chip to chip applications and to develop more sophisticated electro-optical computing devices leading to large scale integrated photonic computing devices that would replace the current generation of servers, computers, and phones. Further, the inventors have found that the process can be slightly modified to allow printing on a flexible substrate which opens up the potential applications to sensors and other flexible optoelectronics.

New polymer optical waveguides have been developed with high transmission rate and minimal bending losses with an effective mass production process that has been made possible through recent advances in digital manufacturing. High transmission rates include transmission rates of at least 25% while minimal bending losses include amounts up to, and including, 75%. Through a combination of micro-dispensing, Fused Deposition Modeling (FDM), and laser subtraction the inventors have created a new optical system with the ability to transmit large amounts of data through small diameter polymer waveguides with minimal bend losses. For reference, large amounts of data include those amounts that are transmitted by at least 0.5 GB/sec and a small diameter single mode fiber would have a maximum size of 9 microns while a small diameter multimode fiber includes sizes of 10 microns and above with exemplary multimode fiber sizes being 25, 50, 62.5 and 125 microns.

In an embodiment, a method of digitally manufacturing a polymer optical waveguide on a flexible substrate is presented comprising: positioning the flexible substrate on a support structure; micro-dispensing a liquid optical adhesive onto the flexible substrate to form a cladding; micro-dispensing a thermoplastic adhesive material onto the flexible substrate after curing the optical adhesive; using a fused deposition modeling additive manufacturing process to extrude a filament of a polymer into a center of the cladding to create a core embedded within the cladding; and using a subtractive laser process to finish end facets of the polymer optical waveguide. The laser used may be a picosecond laser.

The optical adhesive may be curable with ultraviolet (UV) light, in which case, the cladding may be cured with UV light prior to micro-dispensing the thermoplastic adhesive material. The cladding may be cured a second time with UV light after the creation of the core.

The support structure may be flat and capable of heat transfer. The thermoplastic adhesive may be an acrylonitrile butadiene styrene (ABS) liquid material.

The optical adhesive may be selected from the group consisting of urethanes, polyurethanes, acrylics, silicones, epoxies, cyanoacrylates, fluorinated polymers, and combinations thereof.

The polymer of the core may be a thermoplastic selected from the group consisting of acrylics such as poly(methyl methacrylate) (PMMA), synthetic resins, styrene copolymers such as polystyrene, transparent plastics such as polycarbonate and poly(methyl-1-pentene), cyclo olefin polymers (COP), cyclic olefin copolymer, amorphous fluoropolymers such as (poly(perfluoro-butenylvinyl ether) and cyclic transparent optical polymer (CYTOP™), and combinations thereof.

In another embodiment, a method of digitally manufacturing a polymer optical waveguide directly on a printed circuit board is presented comprising: micro-dispensing a ultraviolet light (UV) curable optical adhesive onto the printed circuit board to form a cladding; using a fused deposition modeling additive manufacturing process to extrude a filament of a polymer into a center of the cladding to create a core embedded within the cladding; and using a subtractive laser process to finish end facets of the polymer optical waveguide. The laser may be a picosecond laser.

The cladding may be cured with UV light prior to extruding the filament into the cladding to form the core.

The optical adhesive may be selected from the group consisting of urethanes, polyurethanes, acrylics, silicones, epoxies, cyanoacrylates, fluorinated polymers, and combinations thereof.

The polymer of the core may be a thermoplastic selected from the group consisting of acrylics such as poly(methyl methacrylate) (PMMA), synthetic resins, styrene copolymers such as polystyrene, transparent plastics such as polycarbonate and poly(methyl-1-pentene), cyclo olefin polymers (COP), cyclic olefin copolymer, amorphous fluoropolymers such as (poly(perfluoro-butenylvinyl ether) and cyclic transparent optical polymer (CYTOP™), and combinations thereof.

In a further embodiment, a polymer optical waveguide is provided comprising: a cladding layer wherein the cladding layer comprises a UV curable optical adhesive; a core embedded in the cladding layer wherein the core comprises a polymer having a higher refractive index than the cladding layer wherein the core has a surface variation of less than 1 micron; and end facets having a low root mean square (RMS) surface roughness smaller than a tenth of transmitted wavelength ($\lambda 110$) to pressure wave front geometry and can be aligned perpendicularly to incoming light rays; The polymer optical waveguide may be formed by a process comprising: micro-dispensing a ultraviolet light (UV) curable optical adhesive onto the printed circuit board to form a cladding; curing the cladding with UV light; using a fused deposition modeling additive manufacturing process to extrude a filament of a polymer into a center of the cladding to create a core embedded within the cladding; and using a subtractive laser process to finish end facets of the polymer optical waveguide.

The optical adhesive may be selected from the group consisting of urethanes, polyurethanes, acrylics, silicones, epoxies, cyanoacrylates, fluorinated polymers, and combinations thereof.

The polymer of the core may be a thermoplastic selected from the group consisting of acrylics such as poly(methyl methacrylate) (PMMA), synthetic resins, styrene copolymers such as polystyrene, transparent plastics such as polycarbonate and poly(methyl-1-pentene), cyclo olefin polymers (COP), cyclic olefin copolymer, amorphous fluoropolymers such as (poly(perfluoro-butenylvinyl ether) and cyclic transparent optical polymer (CYTOP™), and combinations thereof.

The waveguide may have a high delta n of at least 0.123 and continue to transmit light effectively at a tight bend radius of up to 3 mm. The waveguide may use a low wavelength of light between about 520 nm to 1550 nm. The waveguide may be single mode or multimode.

The core may have a surface variation of less than 1 micron, or in some embodiments, of less than 425 nm with a diameter of 9 microns, about 25 microns, about 50 microns or about 62.5 microns. In some embodiments, the core is about 50 microns with surface variation less than 500 nm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which:

FIGS. 1A-D are a series of images depicting the fabrication of optical interconnect. (A) a guided channel base cladding; (B) FDM printing of a filament; (C) multiple fiber printing; (D) finished optical assembly with 7 strands with optical adhesive as cladding. Through a combination of micro-dispensing, fused deposition modeling (FDM), and laser subtraction, a new plastic optical waveguide with high transmission rates and 3D curvature has been developed.

FIG. 3A-D are a series of images depicting SEM results indicated a smooth optical core. A, B) Surface variation of less than 425 nm which is much less than the 1 micron required for acceptable transmission. The largest variation observed was about 425 nm, which is less than the 1 micron "ledge" where transmittance falls rapidly; C) Effect of $2\delta\Delta$ on transmitted light intensity; D) SEM images $(3.00_{kx})$ of unclad fibers.

FIG. 4A-C are a series of images depicting laser evaluation of the digitally manufactured plastic optical waveguide. Shown in the images is (A) the actual laser test station setup; (B) the test sample in the rig with 532 nm wavelength laser being used for testing; and (C) actual transmission of light through the fabricated plastic optical waveguide. Initial testing in the laser lab indicates initial transmission of about 46% on proof of concept samples.

FIG. 5A-E are a series of images depicting Using a composite additive and subtractive LE-DPAM process for producing CCS optical fiber interconnects on a PCB board. (A) CCS optical fiber interconnects are used to connect an optical chip to another optical component on a PCB board; (B) The LE-DPAM printing process for fabricating an optical interconnect where an FDM additive manufacturing tool is used to print an ABS base on a PCB board to get the fibers to the correct end facet heights to align components and a cladding material is micro-dispensed onto the substrate; (C) The cladding material is cured with UV energy; (D) The fiber is embedded within the cladding material; (E) The end facets are prepared using a subtractive laser process, and finally components are mounted to the board where communication is via the CCS optical fiber interconnect.

FIG. 8A-B are a series of images depicting the internal thermal profile of liquefier and PMMA material inside of the liquefier. (A) Steady state thermal analysis of the liquefier indicating temperature variation across the liquefier. (B) Temperature variation of the PMMA melt within the liquefier indicating an entry temperature of 41° C. at entry to 178° C. at the heat break zone to 130° C. at nozzle exit.

FIG. 9A-B are a series of images depicting decreasing nozzle diameter creates a higher extrusion force which leads to larger fiber surface roughness and therefore lower optical performance. (A) Surface roughness as a function of nozzle diameter showing the power law increase with nozzle diameter. (B) Extrusion forces as a function of nozzle diameter for the current 1.75 mm filament experiment where an acceptable force of less than 4 N is identified and calculated extrusion forces for a 1.0 mm filament which indicates that a smaller filament would lower the extrusion force to an acceptable value of less than 4 N to allow for single mode fiber printing.

FIG. 10A-E are a series of images depicting optimization of key processing parameters yields a surface roughness of less than 100 nm for a 70-μm fiber. (A) SEM image of the surface roughness of a 70-μm PMMA fiber from a 50-μm zirconia nozzle. (B) Using an image processing software, ImageJ Fuji macro Analyze_Stripes, to determine average surface roughness from SEM images. (C) Effect of temperature on surface roughness with about 266° C. being the optimal nozzle temperature. (D) Effect of traverse speed on surface roughness showing slower traverse speeds resulting in smaller surface roughness. (E) Effect of Filament Feed Speed on surface roughness showing slower feed speeds resulting in smaller surface roughness.

FIG. 11A-B are a series of images depicting the effect of heat transfer conditions when printing fibers inside of cladding material. (A) FDM printing of a PMMA fiber on ABS base and the resultant inhomogeneous heat transfer of the fiber to the substrate verses the fiber to the air results in a difference in cooling and shrinkage rates, yielding a round fiber with a flat bottom. (B) Printing of a fiber inside of the cladding material results in uniform cooling rates which yields a uniformly round fiber.

FIG. 12A-B is a series of images depicting the manufacturing and testing of 77 μm optical fibers. (A) SEM image of an embedded optical fiber in the cladding material. (B) Transmission testing of a proof of concept fiber using a 532 nm laser test station where the transmission rates averaged 63%.

FIG. 13A-B is an example of optical fiber interconnect designs produced using the LE-DPAM methodology. (A) Typical layout of an optical interconnect where an optical interconnect is built upon a flexible substrate and then populated with optical components; (B) SEM image of an actual printed optical fiber interconnect printed on a flexible substrate indicating the substrate, cladding, and the embedded fiber and cut with a picosecond laser.

FIG. 14A-E are a series of images depicting a summary of the LE-DPAM process used for manufacturing an optical interconnect on a flexible substrate. (A) The liquid cladding material is first micro-dispensed onto the flexible substrate; (B) The cladding material is then cured with UV energy to create a solid but still flexible cladding material; (C) An ABS adhesive material is micro-dispensed onto the flexible substrate to help bond the optical fiber to the substrate, and allowed to dry; (D) The fiber is extruded onto the ABS adhesive material on the substrate and then traverses across the cladding material to embedded the optical fiber within the cladding; (E) The end facets are prepared using a subtractive laser ablation process, and finally components are mounted to the flexible substrate where communication is via the optical fiber interconnect.

FIG. 16A-F are a series of images depicting laser cutting images under the main camera and optical microscope. (A) main camera, 400 mW, 1/2/3 cuts; (B) main camera, 1000 mW, 1/2/3 cuts; (C) main camera, 1400 mW, 1/2/3 cuts; (D) optical microscope, 400 mW, 1/2/3 cuts; (E) optical microscope, 1000 mW, 1/2/3 cuts; (F) optical microscope, 1400 mW, 1/2/3 cuts.

FIG. 17A-C are a series of SEM images taken from the top view of the cutting. (A) 400 mW, 3 cuts; (B) 1000 mW, 3 cuts; (C) 1400 mW, 3 cuts.

FIG. 18A-F are a series of images depicting the end facets profiles at different power levels and cut numbers. (A) 1400 mW, 1 path; (B) 1400 Mw, 2 paths; (C) 1400 mW, 3 paths; (D) 1200 mW, 1 path; (E) 1200 Mw, 2 paths; (F) 1200 mW, 3 paths.

FIG. 22A-D are a series of images depicting flexible optical interconnects devices manufactured using the LE-DPAM process having their optical performance. (A) Transmission test of a bent flexible optical interconnect device evaluated with a 632.8 nm laser; (B) Transmission insertion loss as a function of interconnect length indicate insertion losses of less than 0.054 dB per cm; (C) Change in insertion loss as a function of fatigue indicating no change in interconnect performance after 1,000 cycles; (D) Change in insertion loss in flexible optical fiber interconnects as a function of bend radius indicating that optical performance starts to be affected at a radius of about 35 mm for this 125 µm substrate material.

DETAILED DESCRIPTION OF THE PREFERRED EMBODIMENT

Figure 2A:
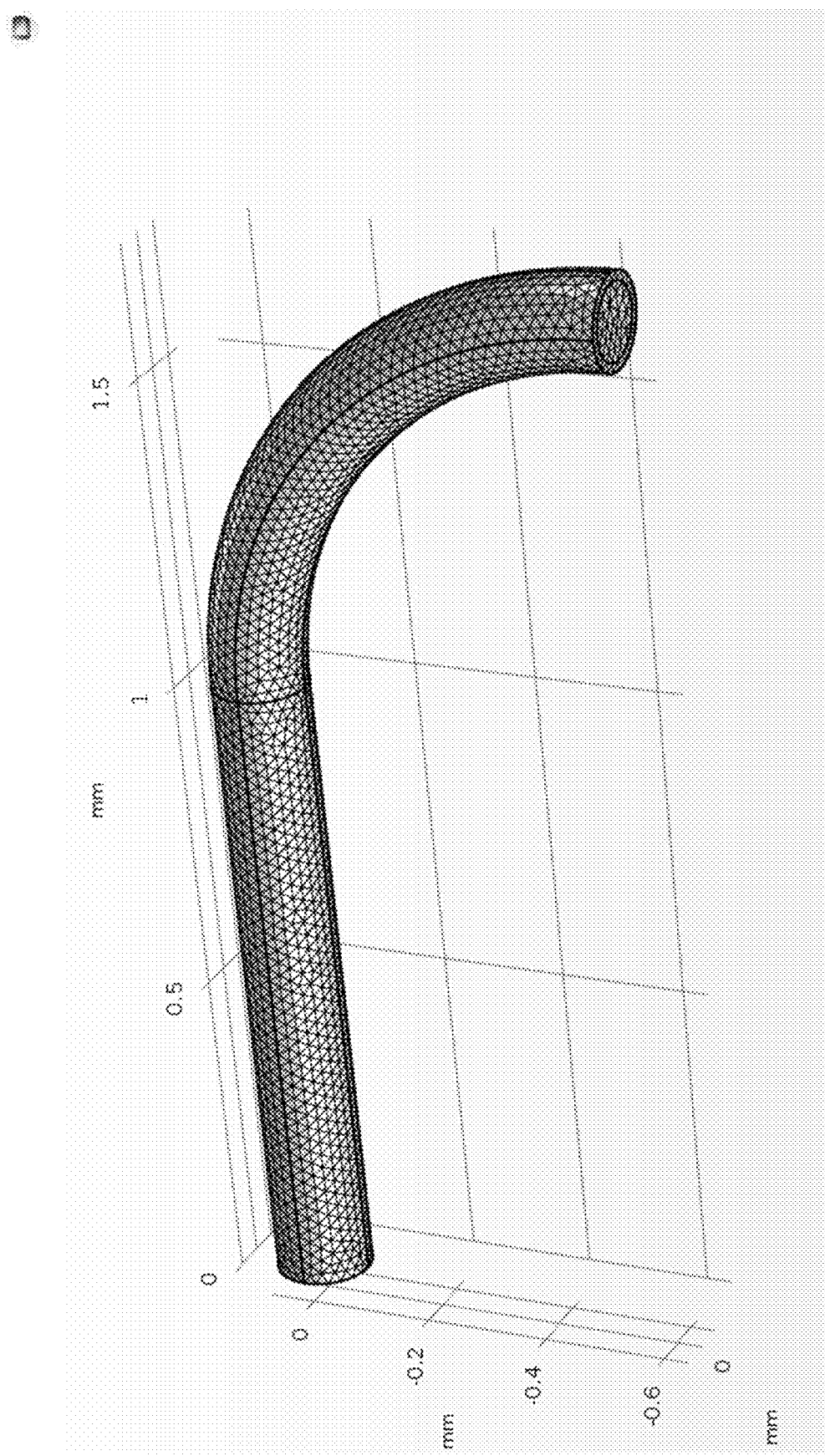
FIG. 2A-E are a series of images depicting COMSOL Ray Optics simulation of PMMA optical fibers. A) Bent fiber mesh, B) Injection of light rays into a PMMA fiber using a 532 nm laser, C) COMSOL Ray Optics simulation of a bent fiber and leakage of light from the bend, D) Smaller radius bent fiber showing light escaping the fiber at the bend, E) Summary of ray optics simulation of transmission as a function of bend angle that indicates the bend radii on a flexible substrate where optical performance breaks down at about a radius of 1 mm.
Figure 2B:
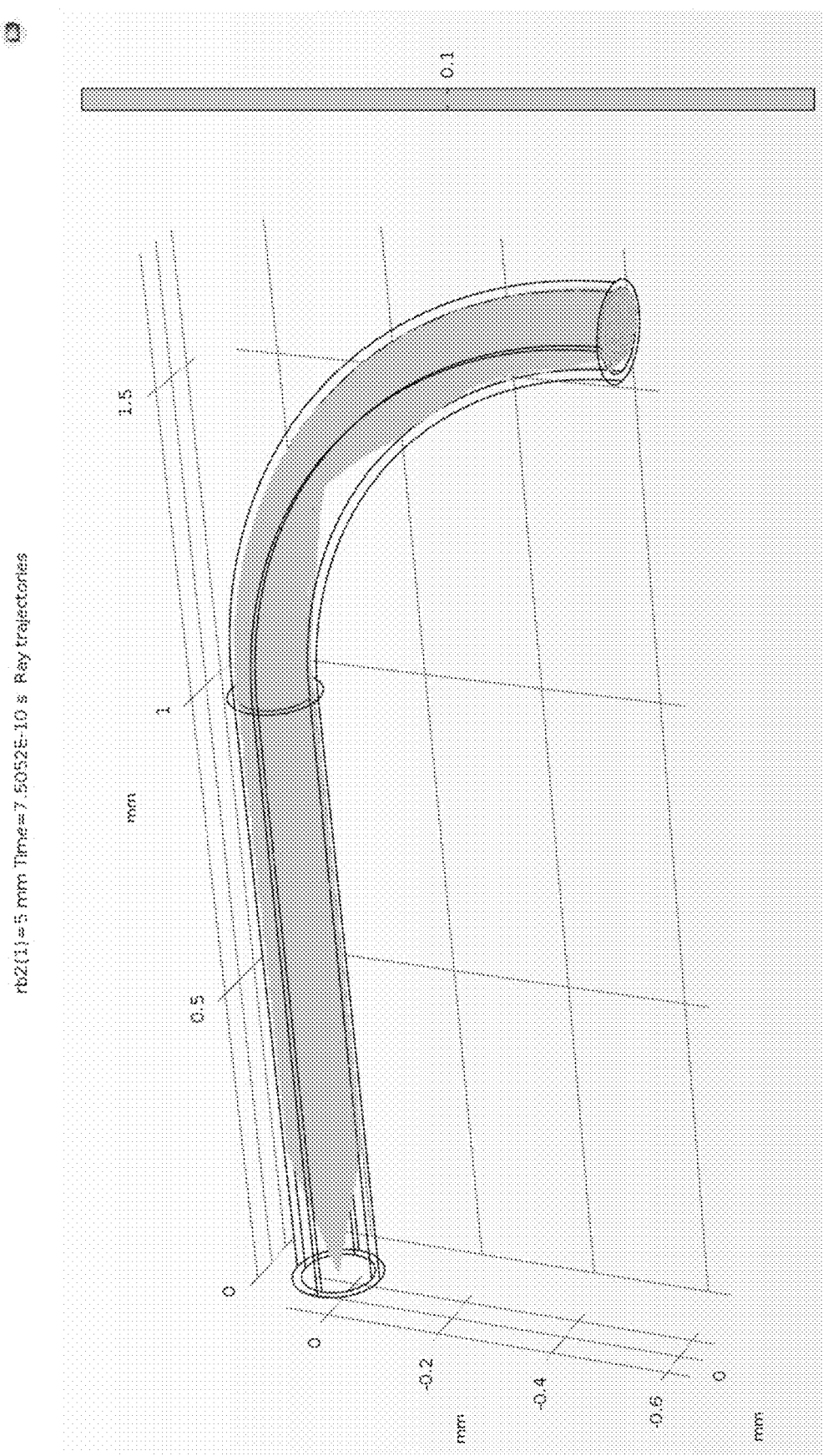
Figure 2C:
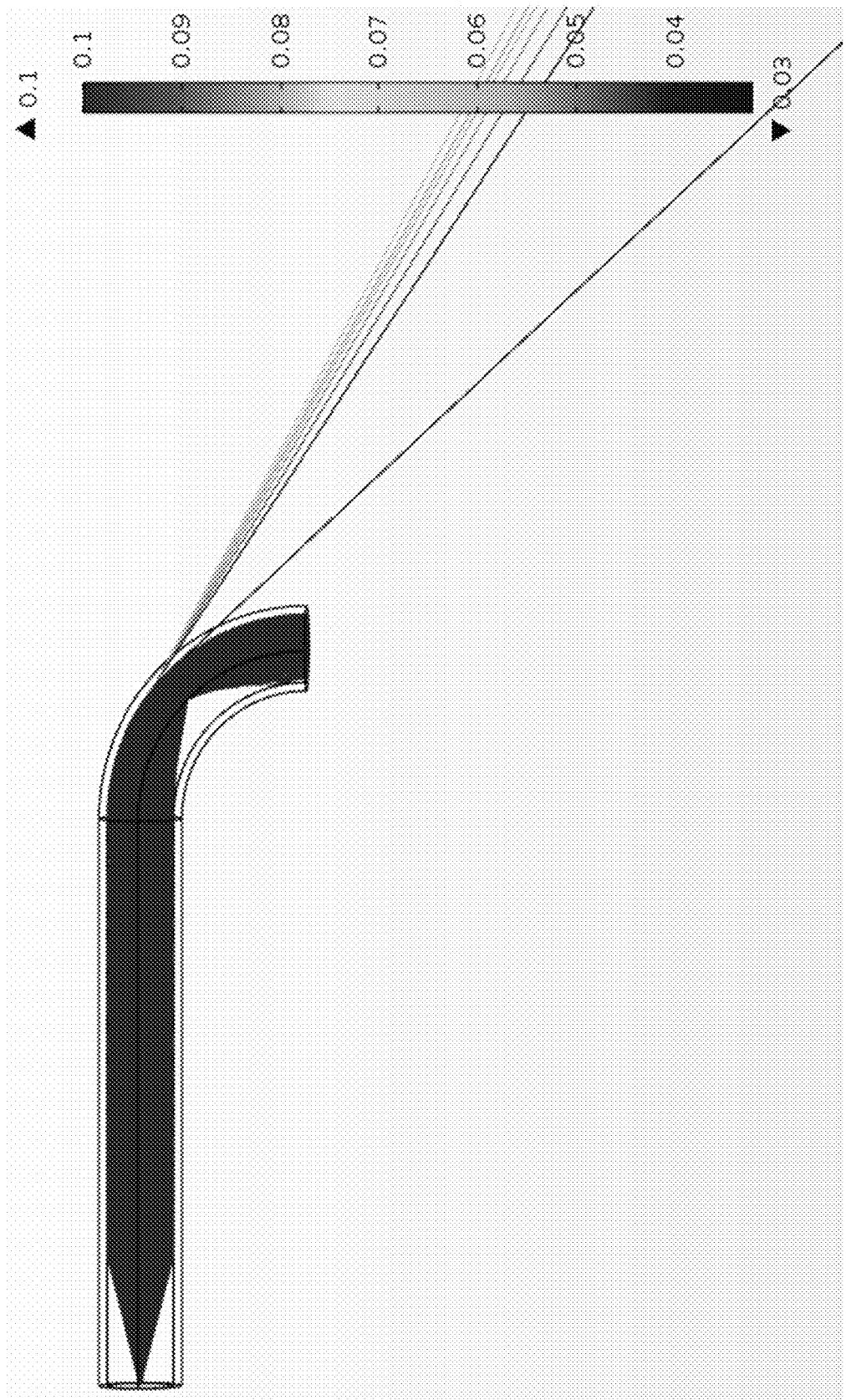
Figure 2D:
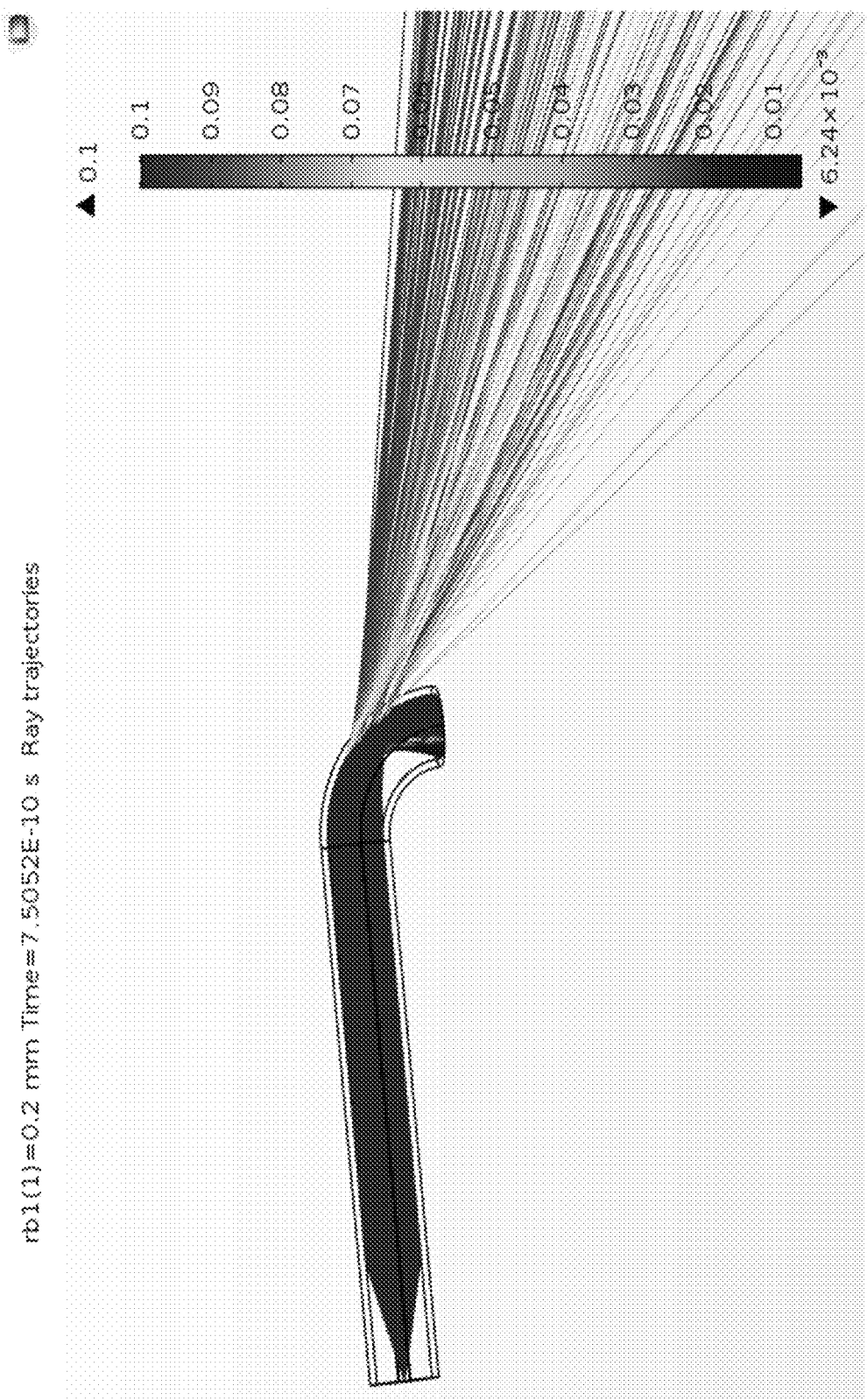
Figure 2E:
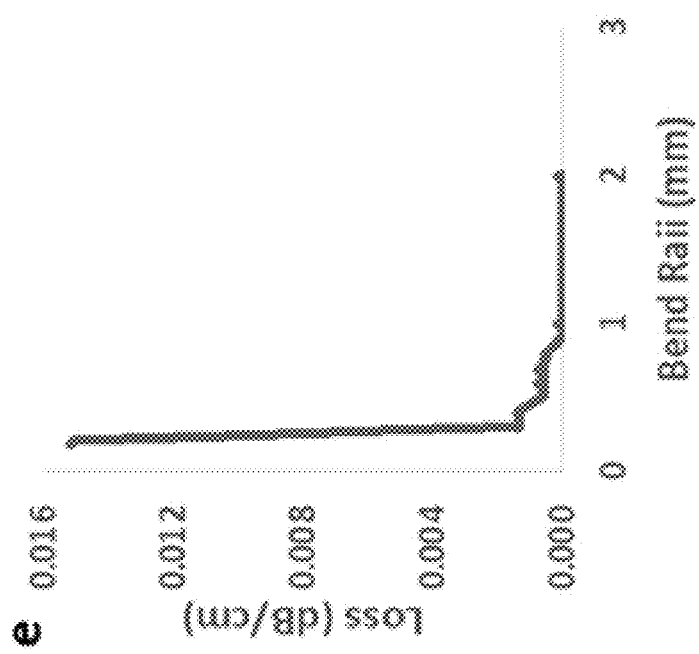
Figure 6:
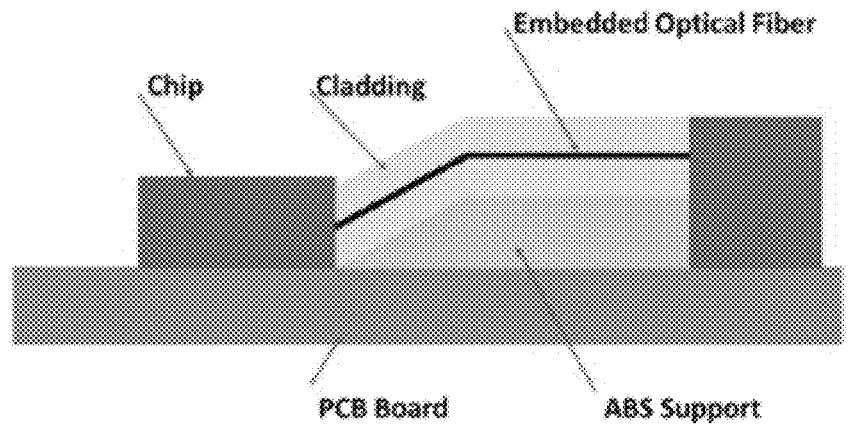
FIG. 6 is an image depicting the fabrication of an optical interconnect using the multi-functional LE-DPAM method. Chips connected by an LEDPAM fabricated optical interconnect on a PCB board. The cladding is micro-dispensed, the fibers are FDM printed in the cladding, the end facets are prepared with a picosecond laser, and finally the chips are placed on the board.

In the following detailed description of the preferred embodiments, reference is made to the accompanying drawings, which form a part hereof, and within which are shown by way of illustration specific embodiments by which the invention may be practiced. It is to be understood that other embodiments may be utilized, and structural changes may be made without departing from the scope of the invention.

Definitions

All numerical designations, including ranges, are approximations which are varied up or down by increments of 1.0 or 0.1, as appropriate. It is to be understood, even if it is not always explicitly stated that all numerical designations are preceded by the term "about". It is also to be understood, even if it is not always explicitly stated, that the reagents described herein are merely exemplary and that equivalents of such are known in the art and can be substituted for the reagents explicitly stated herein.

The term "about" or "approximately" as used herein refers to being within an acceptable error range for the particular value as determined by one of ordinary skill in the art, which will depend in part on how the value is measured or determined, i.e. the limitations of the measurement system, i.e. the degree of precision required for a particular purpose. As used herein, the term "about" refers to ±10%.

As used in the specification and claims, the singular form "a", "an" and "the" include plural references unless the context clearly dictates otherwise.

"Polymer" as used herein refers to a relatively high molecular weight organic compound, natural or synthetic, whose structure can be represented by a repeated small unit, the monomer. Synthetic polymers are typically formed by addition or condensation polymerization of monomers.

"Copolymer" as used herein refers to a polymer formed from two or more different repeating units (monomer residues).

"Optical adhesives" as used herein refers to either single or multiple component materials that may cure when exposed to ultraviolet or blue light. Examples of optical adhesives include, but are not limited to, urethanes, polyurethanes, acrylics, silicones, epoxies, cyanoacrylates, fluorinated polymers, and combinations thereof.

"Cladding" as used herein refers to one or multiple layers of an optical adhesive having a lower refractive index surrounding a core made of a thermoplastic or glass material having a higher refractive index than the cladding. The cladding functions to trap light within the core by total internal reflection at the boundary between the cladding and the core. The inventors either embed the core into the cladding or apply the cladding on the core and subsequently In an embodiment, formation of the tube-shaped cladding in the invention is accomplished by a multistep process in which a first layer of optical adhesive is deposited in a guide channel and UV cured, after which the core is deposited onto the first layer of the optical adhesive. A second layer of optical adhesive is then deposited on top of the core material and UV cured to complete the tube-shaped cladding surrounding the core. In another embodiment, the cladding is formed first and then the core is injected into the center of the cladding to embed it within the cladding. Cladding typically has an inner diameter of the core material and an outer diameter equal to between about 62.5 microns to about 125 microns, however the instantly claimed process allows for much more flexibility. With the instant process, the cladding material can be a minimum of 10% larger than the core with a maximum being as thick as needed in order to change heights to mate up to different components. The process of the instant invention allows for dispensing the cladding in three dimensions (3D) so the cladding thickness can reach up to 5 mm, for example, if it was needed.

"Core" as used herein refers to the light transmission area of an optical interconnect or waveguide which is manufactured of a polymer, preferably a thermoplastic, having a higher refractive index than the cladding material surrounding it. While the core is described as being a polymer, other materials such as glass are capable of being used in the fused deposition modeling process of creating the core.

"Thermoplastic" as used herein refers to substances that become plastic upon heating and harden upon cooling and retain these properties upon repeating these processes. The thermoplastics used herein are clear and have a higher refractive index as compared to the cladding material used. Examples include, but are not limited to, acrylics such as poly(methyl methacrylate) (PMMA), synthetic resins, styrene copolymers such as polystyrene, transparent plastics such as polycarbonate and poly(methyl-1-pentene), cyclo olefin polymers (COP), cyclic olefin copolymer, amorphous fluoropolymers such as (poly(perfluoro-butenylvinyl ether) and cyclic transparent optical polymer (CYTOP™) or combinations thereof.

"Waveguide" or "optical waveguide" as used herein refers to a structure used to guide light by restricting the spatial region in which the light can propagate. "Optical interconnect" is used synonymously with "optical waveguide" herein. In some embodiments, the optical interconnects are round in shape.

"Substrate" as used herein refers to a base layer upon which the optical waveguide is formed. In some embodiments, the substrate is rigid such as a circuit board or chip. In other embodiments, the substrate is flexible. If the substrate is flexible, it may have a supporting structure beneath it while the waveguide is being formed.

"Support structure" as used herein refers to an inflexible structure upon which a flexible substrate may be positioned for formation of an optical waveguide by the novel process described herein. Preferably, the support structure is flat and capable of heat transfer. An exemplary support structure is a metal sheet.

"ABS liquid material" as used herein refers to a thermoplastic adhesive applied to the surface of the substrate under the start and finish of the FDM printed fiber to act as an adhesive to bond the optical fiber to the substrate. In some embodiments, ABS was dissolved in 50 mL of acetone ("ABS liquid material") for 8 hours to form the ABS liquid material. Various concentrations of the ABS liquid material are contemplated as the acetone will evaporate.

The present disclosure provides novel optical waveguides and methods of manufacture thereof. The following non-limiting examples illustrate exemplary systems and components thereof in accordance with various embodiments of the disclosure. The examples are merely illustrative and are not intended to limit the disclosure in any way.

In Example 1, the inventors demonstrate production of optical interconnects by a novel process of laser enhanced direct print additive manufacturing (LE-DPAM) that combines fused deposition modeling (FDM) of plastic, micro-dispensing of rubber-like materials, and picosecond laser subtraction.

The inventors fabricate and test new samples to determine the minimum fiber sizes that can be fabricated as well as test bent fiber samples to determine transmission capabilities. Fibers of 11 microns, 9 microns, and even smaller can be fabricated using the novel method. The inventors also develop capabilities to fabricate 3D shapes with precise x, y, z end facet locations; fabricate and test prototype devices for industrial testing; and create a device fabrication industrial process.

With regard to 3D shapes, the optical interconnects are fabricated directly on the printed circuit boards (PCB) by placing the fibers and end facets precisely on the board allowing for everything to line up when components are placed on the board.

The commercial fabrication process includes putting a bare PCB in the machine to apply a base plastic layer in different thickness and routings on the board to get the interconnects at the right levels and positions. A first layer of cladding material is micro-dispensed into a channel, the core extruded onto the first layer of cladding material and a second layer of cladding material added or, alternatively, an embedding process is used in which the cladding material is micro-dispensed and the core material is injected into the center of the core material. After the cladding and core are fabricated, a subtractive laser is used to finish the end facets. The finished board can then be removed from the machine, packaged, and shipped.

In Example 2, the inventors further elaborate on the method described in Example 1 and demonstrate production of optical interconnects that can be printed directly on a circuit board using a laser enhanced direct print additive manufacturing (LE-DPAM) combining fused deposition modeling of plastic, micro-dispensing of rubber materials, and picosecond laser subtraction.

Integrated photonics have many compelling advantages for computing and communication applications, including in high-speed and extremely wide bandwidth operations. Current systems are typically hybrid assemblies of packaged photonic devices where printed circuit boards often serve to route electrical signals and power, and in some cases, have runs of optical fibers. The inventors present a flexible, low cost assembly method of optical interconnects for photonic systems that could enable higher transmission rates, lower power requirements, improved signal integrity and timing, less heat generation, and improved security of communication signals. The new process is based on laser enhanced direct print additive manufacturing (LE-DPAM) that combines fused deposition modeling (FDM) of plastic, micro-dispensing of rubber-like materials, and picosecond laser subtraction.

The process is demonstrated by fabricating few-mode and multi-mode optical fibers in a controlled manner such that compact, 3-dimensional optical interconnects can be printed along non-lineal paths. The inventors have produced working optical interconnects with fiber core diameters from 70-µm to as small as 12-µm. The results demonstrate surface roughness of less than 100 nm, and optical transmitted power of 63% that of a commercial fiber, for proof of concept devices. These devices are a starting point in the development of more sophisticated electro-optical computing devices using this new LE-DPAM technique. The LE-DPAM approach could lead to large scale integrated photonic computing devices that would replace our current generation of servers, computers, and phones.

In Example 3, the inventors demonstrate production of flexible optoelectronics using a novel process of shape deposition manufacturing, laser-enhanced direct write additive manufacturing system of micro-dispensing, fused deposition modeling, and laser subtraction.

The integration of flexible photonic components into flexible electronics has created new applications in imaging, sensing, and optical interconnection between devices. While most photonic devices are printed on rigid substrates, the photonic integration of devices on flexible polymer substrates has been demonstrated in recent years. However, current technology of contact and non-contact processes limits the type and performance of optical devices on these flexible substrates and require special processes or product design to get the entry and exit of optical interconnect end facets out of the substrate plane. The inventors have successfully printed three-dimensional photonic interconnects directly on flexible substrates by utilizing recent advances in additive manufacturing. The inventors demonstrate negligible changes in transmission losses through substrate bending at moderate bend radii down to about 20 mm proving that flexible optoelectronic devices are capable of being produced using additive manufacturing tools. Furthermore, a type of shape deposition manufacturing, laser enhanced-direct write additive manufacturing system of micro-dispensing, fused deposition modeling, and laser subtraction has the unique ability to produce flexible optoelectronics in a single automated process. This new flexible contact printing methodology, additive manufacturing of flexible optoelectronics method is the starting point in the development of more sophisticated devices Example 1—LE-DPAM for Manufacturing Optical Interconnects The recent development of digital manufacturing has opened a new chapter of research in optical devices. Equipment that can dispense liquids, extrude advanced materials and reductive technologies like lasers are all incorporated into the same manufacturing process and can lead to the development of innovative new technologies. Utilizing this new digital technology for optical fibers, the inventors have developed new optical devices that can transmit massive amounts of data, up to 40 GB/sec, and can be routed through tight spaces as well as enable new sensors to better understand the world around us and medical devices to improve the human condition. Typical commercial transmission rates for plastic optical fibers are about 1 GB/sec with some approaching 2.5 GB/sec.

Optical Interconnects in Electrical Devices

Moving optical interconnects down to electronic devices requires the development of several new technologies. Vertical-cavity-surface-emitting lasers were the first technology to be created that can emit tiny semiconducting light waves. The next technology required is tiny optical fibers that can easily be "shaped" through small spaces. Conventional silica optical fiber is one solution, but they are difficult for assembly at this size and can scatter light significantly if subjected to tight turns. Silica fibers also use very small delta n values and typically use an infrared wavelength of light. Extruded plastic optical fibers have been developed and they are used primary as large connectors outside the computer to connect servers together or to connect servers to network devices. The currently used fabrication methods for extruded plastic fibers can only produce large cables and are incapable of producing small interconnects.

A new digitally manufactured plastic optical interconnect has been developed that overcomes these issues with standard silica optical fibers and standard plastic optical fibers. The novel process allows for fabrication of small optical interconnects directly on a board which is not possible with the currently used fabrication methods. The fabricated interconnects are capable of being fabricated on the board itself to interconnect various components on the board or alternatively, the process can be used to fabricate interconnects used to connect two boards, or a board to other components, together.

Using a micro-dispensed UV curable urethane as a cladding, the inventors created a 3-dimensional channel using Fused Deposition Modeling (FDM), an additive manufacturing process, to place a core of polymethyl methacrylate (PPMA) inside the channel, applied more micro-dispensed UV curable urethane to complete the cladding and completed the interconnect using a picosecond laser to finish off the end facets of the interconnect so they can be connected to a laser light source and a detector. In another embodiment, the cladding is formed first and then the core is injected into the center of the cladding to embed it within the cladding. With current digital manufacturing equipment, these interconnects can be mass produced as well.

The plastic optical fiber fabricated using the novel method has a high delta n of 0.123, uses a low wavelength of light at 520 nm to 1550 nm, and can continue to transmit light effectively at tight bend radius of up to 3 mm. In some embodiments, the wavelength of the light is 570 nm to 650 nm. For reference, the max n is about 1.53 (for cyclo olefin polymer (COP) material) and the minimum n number is about 1.3 currently but can be lower. Mixing and matching cores and cladding materials produces different delta n which can change the transmission rates and bend optimization thus the novel manufacturing process can be used to tailor the fiber to different applications. Similarly, different wavelengths of light can be used to optimize performance for different applications. For example, lower wavelengths can be used for better bend performance and higher wavelengths can be used for better transmission rates. The standard wavelengths used in the field currently are about 850 nm.

The use of optical adhesive allows for even more customization, depending on the variables of the material such as, modulus of elasticity, elongation at failure and hardness in Shore D. Depending on the specific use, the modulus of elasticity can be between 25 to 250 MPA; the elongation at failure can be between 1 to 100 MPA and the hardness can be between 1 to 75 Shore D.

Methods

Optical Interconnect Fabrication Micro-dispense a UV curable optical adhesive into a guided channel base cladding material. The material used was a Norland NOA 1369 low refractive index adhesive (1.369) at 2100 centipoises. The Norland NOA 1369 is a urethane based on 70-85% aliphatic urethane acrylate and 15-30% acrylate monomer. The modulus of elasticity of the adhesive is 73 MPA with a tensile strength of 7.8 MPA, an elongation at failure of 52% and a hardness of 30 Shore D.

Cure the guided channel base cladding material with a UV light. Depending on UV wavelength and power, the curing time can be between about 10 seconds to 10 minutes. The specific channel base cladding material used in this example must be cured with UV light between 315 to 395 nm with full cure requiring 6 Joules/cm 2. The adhesive used in this example exhibits oxygen inhibition when used as a coating and to overcome this, the adhesive must be cured under an inert atmosphere such as nitrogen. Other optical adhesives can be used with the novel method described herein which do not require curing in an inert atmosphere. The refractive index of both the core and the cladding can be changed to optimize the product for the specific application.

Using an nScrypt digital manufacturing workstation, the inventors used Fused Deposition Modeling (FDM) to extrude a single filament of polymethyl methacrylate (PMMA), with a refractive index of 1.492, from one standoff of the guided channel base cladding to the other standoff. Proper extrusion speed and traverse speed must be maintained to create a consistent filament diameter and correct tension on the filament to create a uniform core. Temperature, extrusion speed, traverse speed, and nozzle design are important variables that can be adjusted according to the various application.

PMMA has a high transmission rate of over 98% over 3 mm with a single window at 550-650 nm wavelengths suitable for optic fiber communication at theoretically 55 dB/km at 570 nm. (P.V. Thorat, S. W., P. A. Thombre. Plastic Optical Fiber. *International Journal of Engineering Research and Reviews* 2, 95-104 (2014)).

Additional micro-dispensed UV curable optical adhesive is applied to the guided channel cladding/PMMA core to completely encapsulate the core in optical adhesive. The core needs to be completely enclosed with at least a 10% of core diameter coating, up to any thickness needed for the routing. This can be accomplished with embedding the core in the cladding or adding more cladding afterwards, both of which processes are described herein.

The new layer of optical adhesive is UV cured. Light, which transmits through an optical waveguide, passes through the ends of the optically transparent structure, which are commonly referred to as end facets. These surfaces must exhibit specific characteristics to minimize the coupling losses, and therefore the optical attenuation, of the transmission path. It is required that the end facets are flat and smooth, having a low root mean square (RMS) surface roughness which is smaller than a tenth of the transmitted wavelength (λ/10) to pressure wave front geometry. For example, for the wavelength of 532 nm, the RMS would need to be less than 53 nm. Wavelengths that can be used with the fabrication method described herein range from about 500 nm to 1550 nm. For this experiment the end facets were prepared using a cutting process and then manually polishing with abrasive sheets with increasingly smaller grain sizes. (Wolfer, T., Bollgruen, P., Mager, D., Overmeyer, L. & Korvink, J. G. Printing and preparation of integrated optical waveguides for optronic sensor networks. Mechatronics 34, 119-127, (2016)).

Numerical Methods

Optical fibers are typically broken into two groups, single-mode fibers with a comparatively small core which requires the wave model of light, and multimode fibers, whose core is large enough to be analyzed with a geometric ray-tracing model. (P.V. Thorat, S. W., P. A. Thombre. Plastic Optical Fiber. *International Journal of Engineering Research and Reviews* 2, 95-104 (2014)). The boundary of the two groups is determined by the structural parameter V:

$$V = \frac{2\pi\rho}{\lambda}(n_{co}^2 - n_{ct}^2)^{1/2} \quad (1)$$

At a core diameter of 50 micron with the novel PMMA fiber and optical adhesive cladding, the inventors are well into the multimode fiber range with over 4,000 modes.

Numerical simulations of the optical interconnect were performed using COMSOL with the Ray Tracing Module. The simulations confirmed that the inventors should have nearly 100% transmission for the 50-micron diameter core optical interconnect. For reference, single mode cores are about 9 microns with common multi-mode sizes being 25, 50, 62.5 and 125 microns, however other sizes are contemplated.

For industrial applications in which optical interconnects are needed to route through tight spaces, curved fibers are required. The simulations show that the waveguide can successfully accommodate curves as tight at 0.3 mm without significant losses.

The surface roughness of optical fibers directly affects the optical reflectivity of the interface between the fiber and cladding and is important for the construction of an optical interconnect.

Unclad fibers were evaluated using SEM. The surface of the PMMA core is smooth with a surface variation of less than 425 nm. This smooth surface is critical for total internal reflection to take place. For the core diameter of 50 microns, the inventors need a surface variation of less than 1 micron for a high transmission optical fiber. This ratio can be applied to other core diameters. (Zhong, N. et al. Effects of surface roughness on optical properties and sensitivity of fiber-optic evanescent wave sensors. *Appl. Opt.* 52, 3937-3945, (2013)). The inventors are able to fabricate a core using the novel process which has a surface variation of less than 500 nm.

Results

A laser test workstation was set up to test the light transmission capability of the novel optical interconnect. A 532 nm laser was used and was filtered down to 1.32 mW of power at the inlet of the fiber. The optical interconnect averaged a transmission of 45.6% in the testing. End facet preparation is likely a major source of loss in the system as the surface quality was not evaluated. Simulations have shown transmission rates in the mid-90% range.

End facets must be aligned perpendicularly to the incoming light rays and must be located at a specific geometrical position in relation to the surrounding optical sources and detectors. The end facet for a single mode fiber needs to be less than 1 micron (5 microns for multimode fibers) in x, y, and z out of center. This may be a source of loss in the system as the inventors did not have a theta stage to optimize the alignment. (D. Bailey, E. W. in *Practical Fiber Optics* (ed D. B. Wright) 97-119 (Oxford: Newnes, 2003)). This creates a demand for a specifically adapted process, such as the laser reduction process with nScrypt picosecond laser used by the inventors in this example. Processing the end facets with the laser allows the entire production process to be completed in the same machine. In other words, the process can be completed on computer printed circuit boards (PCB) directly whereas it would be difficult to process the end facets any other way.

Conclusions

The inventors have demonstrated a novel optical interconnect using a digitally manufactured process utilizing a micro-dispensed UV optical adhesive as the contour guiding cladding, a fused deposition modeling technology for creating a core, additional optical adhesive to complete the cladding and a subtractive laser process to finish the two ends of the optical interconnect. The proposed technique can be applied to various board to board or board to chip applications and can be realized as a mass production process.

Example 2—Printing Directly onto a Chip

To exploit the capabilities of new additive and subtractive manufacturing techniques, the inventors propose a new Laser Enhanced Direct Print Additive Manufacturing (LE-DPAM) process for manufacturing CCS plastic optical fiber-based circuit boards where all the additive and subtractive manufacturing steps are completed in the same multi-function LE-DPAM automation. This is a shape deposition manufacturing (SDM) process where complex parts are made by combining material through additive and subtractive processes. (F. B. Prinz, L. E. Weiss, Novel applications and implementations of shape deposition manufacturing, Naval research reviews 50 (1998) 19-26; C. B. Williams, F. Mistree, D. W. Rosen, A Functional Classification Framework for the Conceptual Design of Additive Manufacturing Technologies, Journal of Mechanical Design 133 (12) (2011); K. B. Perez, C. B. Williams, Combining additive manufacturing and direct write for integrated electronics—a review, 24th International Solid Freeform Fabrication Symposium—An Additive Manufacturing Conference, S F F, 2013).

First, a layer of a UV-curable optical adhesive blend of aliphatic urethane acrylate and acrylate monomer cladding material is micro-dispensed on a circuit board. Next, an optical fiber of polymethyl methacrylate (PMMA) is 3D printed into the bulk of the cladding material using fused deposition modeling (FDM). (P.V. Thorat, S. W, P. A. Thombre, Plastic Optical Fiber, International Journal of Engineering Research and Reviews 2 (4) (2014) 95-104). Finally, the end facets are laser cut with a picosecond laser For this experiment samples were also cleaved and polished. (Wolfer, T., et al., Printing and preparation of integrated optical waveguides for optronic sensor networks. Mechatronics, 2016. 34: p. 119-127). This process is shown in FIG. 5A-E. Following these steps, the board is then ready to be populated with optical components. In this experiment, the inventors have developed a functioning optical interconnect using the proposed LE-DPAM technology. The integrated LE-DPAM automation completes the entire process of micro-dispensing, FDM printing, and laser subtraction in the same machine without the complex material handling and registration of other hybrid systems. (S. Ambriz, et al., Material handling and registration for an additive manufacturing based hybrid system, Journal of Manufacturing Systems 45 (2017) 17-27).

The process for the extrusion of PMMA material for optical patch cables is well understood. The novel method presented herein also uses PMMA, but a fiber is directly embedded into an already deposited optical cladding material. The PMMA filament is melted in a liquefier and forced through a die by the force of the raw material filament being fed into the liquefier. To print a high-quality finished PMMA fiber, the temperature of the melt must be controlled, the die must be of the correct size and quality, the take up speed of the fiber must be controlled by the traverse speed of the head, and the force applied to the melted pellets into the die must be controlled by the feed rate of filament into the liquefier. A transport model was used to predict the effect of these printing parameters on the final extruded fiber. (Bellini, A., S. Guceri, and M. Bertoldi, *Liquefier dynamics in fused deposition.* Journal of Manufacturing Science and Engineering, 2004. 126(2): p. 237-246). Reasonable processing parameters were selected based on the simulation, the inventors' experience, and empirical evidence. Numerous samples were produced and evaluated, and optimum processing conditions were determined and used in the remainder of the experiments. Numerical modeling of the heat transfer dynamics inside the liquefier and the resultant fiber temperature profile leaving the liquefier was conducted to better understand the effects of temperature on cooling stresses. Optical microscopy and low vacuum SEM were used along with image processing software to evaluate the roundness and surface roughness of the fibers, which are common measures that govern the transmission capability of the optical fibers.

The inventors link the printing parameters and the physical properties of the polymer to the surface roughness and shape of the fiber, which determine the optical transmission capabilities of the fiber. The novel process described herein proposes a composite printing process where additive and subtractive processes are combined in one automated process to manufacture 3-dimensional optical interconnects for on-board computing applications. The inventors have focused on the processing conditions that are needed to create low surface roughness and CCS fibers which can then be fabricated into high transmission capable optical products.

Materials and Methods

Sample Production Process

Laser Enhanced Direct Print Additive Manufacturing (LE-DPAM) is an additive and subtractive composite manufacturing process. (Rojas-Nastrucci, E. A., et al., *Characterization and modeling of K-band coplanar waveguides digitally manufactured using pulsed picosecond laser machining of thick-film conductive paste.* IEEE Transactions on Microwave Theory and Techniques, 2017. 65(9): p. 3180-3187). For the experiment, the inventors used a commercially available printer, the nScrypt 3Dn-Tabletop with an additive micro-dispenser, an additive FDM printer and a subtractive picosecond laser.

Processing parameters used in the experiments are indicated in Table 1 below:

TABLE 1

Processing Parameters for Manufacturing of an Optical Fiber by Direct Print Additive Manufacturing

| Process | Parameter |
|---|---|
| Micro-Dispensing Size | 10-cc |
| Micro-Dispensing Pressure | 6 psi |
| UV Curing Time | 7 minutes |
| UV Curing Wavelength | 365 nm |
| UV Curing Power | 21,700 mW/cm2 |
| FDM Nozzle Size | 50-micron Zirconia |
| FDM Nozzle Temperature | 266° C. |
| FDM Nozzle Speed | 0.03 mm/s |
| FDM Nozzle Traverse Speed | 10 mm/s |
| FDM Bed Temperature | 105° C. |
| Laser wavelength | 355 nm |

The cladding material was cured with a BLAK-Ray Long Wave Ultraviolet Lamp, Model B 100 AP/R. The microdispensed cladding material was a UV-curable optical adhesive blend of aliphatic urethane acrylate and acrylate monomer cladding material (Norland 1369 optical adhesive) and was about 200 μm thick and 2 cm long in the experiments. PMMA filaments were used for the fibers (Treed, part number HIRMA) and were dried at 94° C. for 3 hours before the extrusion process in a Fisher Scientific Isotemp Vacuum Oven Model 280A. PMMA filaments were prepared using a Filabot EX2 single-screw extruder that was heated to 240° C. for the only temperature zone. The filament was extruded, air cooled and collected on an Filabot Spooler. The filament was dried at 70° C. for at least 4 hours before use. A 2 cm length of PMMA fiber was then embedded into the cladding material so that it has a uniform thickness of cladding around the 77-μm fiber. The glass transition (Tg) and melting temperature (Tm), as well as the kinetics of crystallization of the PMMA were determined using differential scanning colorimetry (DSC). All the DSC experiments were performed at a ramp rate of 10° C./min under nitrogen flow with an approximate sample weight of 10 mg. The cladding and core materials are commercial materials and were chosen because they are currently used in the production of plastic optical fiber systems and have been through manufacturer test programs to ensure that they are not affected by temperature, humidity, or other environmental issues. Other cladding and core materials are contemplated for use in the instant invention given that the materials are not affected by temperature, humidity, or other environmental issues.

The preparation of the fiber end facets is critical to reduce the connector losses to optical components. The LE-DPAM process integrates a subtractive picosecond laser at 355 nm on the same micropositioning platform. While the inventors were able to process end facets, the surface roughness with a 355 nm laser is not smooth enough for proper connections. A 193 nm laser is the suggested wavelength for laser ablation of PMMA. (L. Levesque, V. Jdanov, Optical fiber cleaved at an angle by CO2 laser ablation: Application to micromachining, Optics & Laser Technology 42 (7) (2010) 1080-1083; M. Gedvilas, G. Račiukaitis, Investigation of UV picosecond laser ablation of polymers, EPIC/SPIE Workshop on laser applications in Europe Vol. 6157 SPIE, 2005; J.-Y. Cheng, et al., Direct-write laser micromachining and universal surface modification of PMMA for device development, Sensors and Actuators B: Chemical 99(1) (2004) 186-196). Due to these high roughness measurements on initial samples, for these experiments, the end facets were hand polished. The end facets were prepared on a Buehler ECOMET III Polisher/Grinder using a process where the end of the fiber is cleaved with a razor blade. The sample was then progressively ground with 320, 400, and 600 grit paper. Polishing of the end facet was done with an 18.3-µm polish on paper (Matador 991A Softflex). Polishing continued with 5-µm diamond paste (Micromesh 4000) and final polishing was completed with a 2.1-µm polish on cloth (Micro-mesh 12,000). Surface roughness was measured using an image processing software applied to SEM images. A 100 nm surface roughness of the end facet is measured which is more than the 63.8 nm required for optimum transmission. (Wolfer, T., et al., *Printing and preparation of integrated optical waveguides for optronic sensor networks.* Mechatronics, 2016. 34: p. 119-127). Future work includes optimizing the picosecond laser to automatically finish the end facets to a higher standard to reduce transmission losses associated with excess surface roughness.

Optical and SEM Microscopy for Surface Roughness

Optical microscopy was performed using a Leitz Brand 15G optical microscope. Because the fiber diameter was less than 100-µm and the surface roughness feature size was less than 200 nm, scanning electron microscopy (SEM) was used to evaluate surface roughness on the sampled (focused ion beam (FIB) Quanta 3D Dual Beam Imaging System). Due to the non-conductive nature of PMMA, the SEM was used in low pressure SEM mode operating with an acceleration voltage of 30 kV and a pressure of 0.56 Torr. The lower pressure SEM images were then used to determine the surface roughness of the fibers using ImageJ Analyze_Stripes. Analyze_Stripes is a Fiji (or ImageJ) macro designed to measure the width, edge roughness, and orientation angle of edges.

Transmission Testing Procedure

To evaluate the optical transmission capability of the fibers, two different lasers were used in the test program. Optical wavelength lasers were used for the experiments due to ease of use and lab safety. A 1.5 mW Melles Griot 05-LHR-911 laser at 632.8 nm wavelength was used. Power was reduced to 1 mW for the experiments. A 532 nm laser was also used at reduced power of 1 mW for the experiments. An LWD M SPLAN50 0.60 infinity/0 f=180 objective lens was used to focus light on the end facet of the fiber. A pinhole was used to eliminate stray light from the setup. A beam splitter and reflected light was used to provide imaging to a CCD camera that allowed the inventors to image the end facet for alignment. Power measurements were made with a Thorlabs USB Power Meter (PM16-120).

Theory and Calculations

In developing a new optical fiber interconnect formed by the novel process disclosed herein, minimizing the surface roughness of the fiber is important to optical transmission of the fiber. The experiments have shown that dynamics within the liquefier effect the surface roughness of the extruded fiber. The extrusion forces are a function of the pressure drop within the liquefier and the cross-sectional area of the liquefier.

Transport Analysis of Flow in the Liquefier

When printing conditions, such as temperature, nozzle traverse speed, filament feed rate and nozzle diameter are changed, the viscosity of the PMMA fluid changes affecting the shear rate and pressure drop that the fiber sees during the FDM printing process. Because of these changes in shear rate and pressure drop, the fiber surface roughness is affected, which in turn affects the transmission capabilities of the fiber. Therefore, determining the optimum properties and their influence on the resultant surface roughness properties are of utmost importance. In the present section, the analytical equations for determining the variation of the viscosity and the pressure drop in FDM printing of the small diameter fibers for the non-Newtonian PMMA melt are presented and exploited.

The effect of rheology has been covered well by Balani et al. and provides the average shear rate in the liquefier as:

$$\frac{dv}{dr} = \frac{3n+1}{nR} * v_f * \left[\left(\frac{r}{R}\right)^{\frac{1+n}{n}-1}\right] \quad (2)$$

where $v_f$ is the inlet velocity of the PMMA in the liquefier, r is the distance from the center of the nozzle, R is the nozzle radius, and n is the power law coefficient equal to 0.25. (Balani, S. B., et al., *Influence of printing parameters on the stability of deposited beads in fused filament fabrication of poly (lactic) acid.* Additive Manufacturing, 2019. 25: p. 112-121; Q. H. Nguyen, N.-D. Nguyen, Incompressible non-Newtonian fluid flows, in Continuum Mechanics-Progress in fundamentals and Engineering applications, InTech, 2012).

The force required to extrude the melt must be sufficient to overcome that created by the pressure drop across the flow path, which include the two straight sections and one conical section. The shear rate profile can be obtained from the velocity profile:

$$\dot{\gamma} = \frac{dv}{dr} \quad (3)$$

Thermoplastic materials currently used in FDM exhibit shear thinning behavior. The non-Newtonian power law is applicable for flow of molten polymers such as ABS and PMMA:

$$\tau = \left(\frac{\dot{\gamma}}{\varphi}\right)^{\frac{1}{m}} \quad (4)$$

where m is the flow exponent of 4.0 and φ is the fluidity of $3.9\times10^{14}$ Pa $s^n$, τ is the shear stress and ẏ is the shear rate. (Q. H. Nguyen, N.-D. Nguyen, Incompressible non-Newtonian fluid flows, in Continuum Mechanics-Progress in fundamentals and Engineering applications, InTech, 2012).

Figure 7:
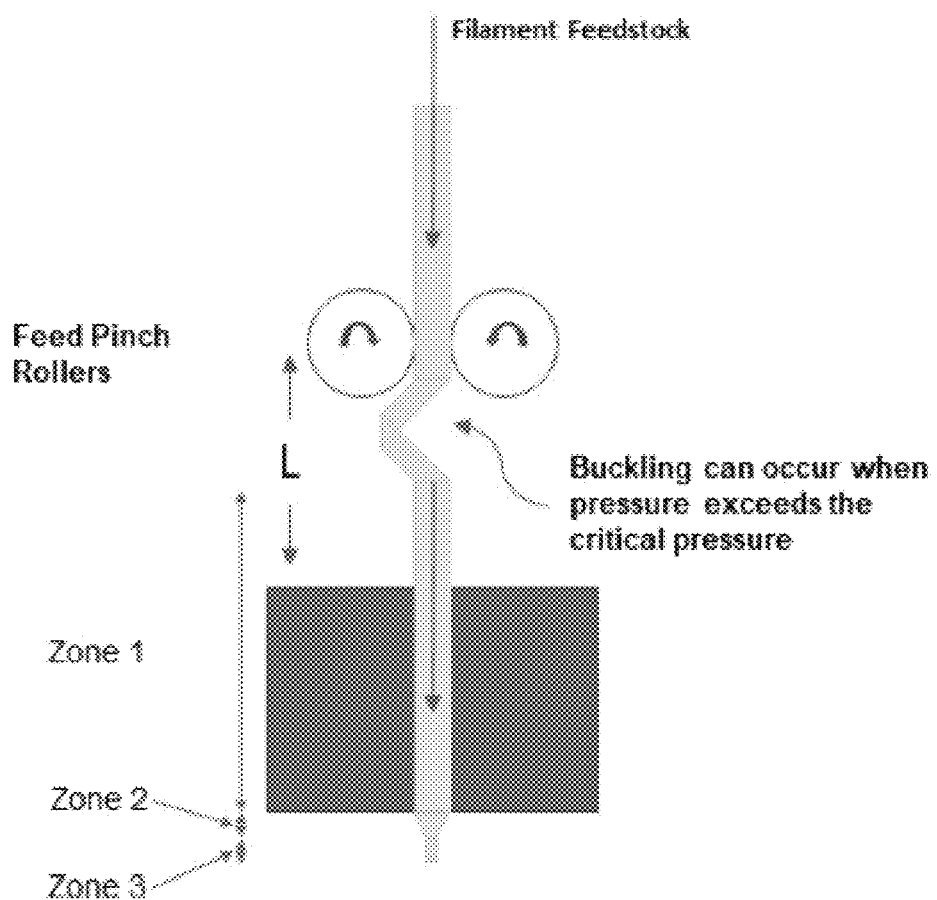
FIG. 7 is an image depicting liquefier design where filament is fed into zone 1 by pinch rollers and is heated and compressed into zone 2 after which it is stabilized and exits zone 3.

The pressure drops in the system are denoted as $\Delta P_1$ for the large diameter straight section of the liquefier, $\Delta P_2$ for the conical section of the liquefier and for the final straight smaller diameter section of the liquefier. The corresponding zones are identified in FIG. 7. Solution of the governing momentum balance equations are available, with pressure drops given as in Bellini et al. 2004 and Nguyen et al. 2012:

$$\Delta P_1 = 2L_1\left(\frac{v_f}{\varphi}\right)^{\frac{1}{m}}\left(\frac{m+3}{(D_1/2)^{m+1}}\right)^{\frac{1}{m}} \cdot e^{[\alpha(1/T - 1/T'_\alpha)]} \quad (5)$$

$$\Delta P_2 = \left(\frac{2*m}{3\cdot\tan(\beta/2)}\right)\left(\frac{1}{D_2^{3/m}} - \frac{1}{D_1^{3/m}}\right)$$
$$\left(\frac{v_f}{\varphi}\right)^{1/m}\left(\left(\frac{D_1}{2}\right)^2(m+3)\cdot 2^{m+3}\right)^{1/m} \cdot e^{[\alpha(1/T - 1/T_\alpha)]} \quad (6)$$

$$\Delta P_3 = 2L_2\left(\frac{v_f}{\varphi}\right)^{1/m}\left(\frac{(m+3)(D_{1/2})^2}{(D_{2/2})^{m+3}}\right)^{\frac{1}{m}} \cdot e^{[\alpha(1/T - 1/T_\alpha)]} \quad (7)$$

where $D_1=1.75$ mm is the diameter of the liquefier section zone 1 in FIG. 7, $L1=15$ mm is the length of the liquefier in zone 1, $D_2=50$ microns is the diameter of the tip in zone 3 and $L_2=10$ microns is the length of the tip in zone 3 and $\beta=32°$ is the convergence angle of the liquefier tip-diameter transition $v_f$ is the velocity of the filament at the entrance of the liquefier, of 0.03 mm/s.

The activation is denoted by α and is 126 kJ/mol and Ta is the reference temperature of 443 K at which m and φ are calculated. (Y. Lou, Q. Lei, G. Wu, Research on Polymer Viscous Flow Activation Energy and Non-Newtonian Index Model Based on Feature Size, Advances in Polymer Technology (2019) 2019; H. Ramanath, et al., Melt flow behaviour of poly-ε-caprolactone in fused deposition modelling, Journal of Materials Science: Materials in Medicine 19 (7) (2008) 2541-2550)

The total pressure drop ΔP is $$\Delta P=\Delta O_1+\Delta P_2+\Delta P_3 \tag{8}$$

The compression force that must be applied to the filament for extrusion to occur is then calculated from this pressure drop as:

$$F=\Delta P \cdot A$$

where A is the cross-sectional area of the liquefier.

Steady State Thermal Simulation

The filament undergoes temperature variations during the extrusion process, with the temperature distribution directly affecting the viscosity of the polymer in the liquefier. For the current liquefier, it is only possible to measure the surface temperature on the outer walls. To better understand this temperature distribution of the PMMA material within the liquefier, the thermal behavior of an FDM liquefier assembly was simulated using ANSYS Steady State Thermal. The liquefier consists of a hot zone that is generated by a single rod type cartridge heater, a heat break zone, and a cooling zone, as depicted in FIG. 8A. The purpose of these three different zones is to hear the PMMA material but prevent the heat from rising up the liquefier and melting the material before it is fully captured in the nozzle within the hot zone. Results of the numerical simulation for the 3 zones shown in FIG. 7 are presented in FIG. 8B.

The outer wall temperature was measured at six different locations using a temperature probe and the numerical simulation was used to calculate the internal material temperature corresponding to six zones with the outer wall temperature assumed to be constant at the measured values in these zones. The temperature averaged over radius and axial length of the zone in each of the zones was utilized in the calculation of pressure drops given by equations 4-6. The average temperature of the PMMA material in the nozzle was lower than the external temperature of the assembly. A summary of these results is presented in Table 2.

TABLE 2

Probe measurements on the exterior of the liquefier in six different zones (indicated in Figure 8A) were used as boundary conditions for numerical simulation to determine internal temperature profile of the PMMA material within the liquefier, which was used as temperature input for Equations 5-7.

| Zone | External Liquefier Temp - Measured (° C.) | PMMA Material Temp - Simulated (° C.) |
|---|---|---|
| 1 | 30 | 41.2 |
| 2 | 38.5 | 49.5 |
| 3 | 63.1 | 59.0 |
| 4 | 200.6 | 139.1 |

TABLE 2-continued

Probe measurements on the exterior of the liquefier in six different zones (indicated in Figure 8A) were used as boundary conditions for numerical simulation to determine internal temperature profile of the PMMA material within the liquefier, which was used as temperature input for Equations 5-7.

| Zone | External Liquefier Temp - Measured (° C.) | PMMA Material Temp - Simulated (° C.) |
|---|---|---|
| 5 | 266.2 | 177.8 |
| 6 | 181.0 | 130.8 |

Results and Discussion

For the experiments, over 100 fibers have been printed for the evaluation of surface roughness and shape to determine the optimum processing conditions to produce the best optical performance of fibers. Fibers of diameters from 150-μm down to 12 μm were printed. Samples were printed in three different methods to evaluate different parameters. Fibers were printed between two ledges and covered with cladding material in an easy-to-produce idealized process to evaluate surface roughness. Samples were printed onto the cladding material, and then the cladding material printed over it, however it yielded a non-round fiber. Finally, fibers were printed within the cladding material which produce round fibers. To determine the optimum processing conditions, a three factor, two level, five trial design of experiments (DOE) was conducted on the standard LE-DPAM processing conditions of extruder speed, traverse speed, and temperature. With an optimum process defined, samples were evaluated for surface roughness, roundness, and optical transmission capability, all of which are described in the sections below.

Surface Roughness Due to Processing Conditions

Surface roughness of the optical fiber plays a critical role in the total internal reflection of light in a 3D printed optical fiber, hence this roughness was investigated to establish a quantitative correlation between surface roughness and relevant printing parameters. (Zhong, N., et al., *Effects of surface roughness on optical properties and sensitivity of fiber-optic evanescent wave sensors*. Applied Optics, 2013. 52(17): p. 3937-3945) Commercial PMMA optical fibers were characterized using a low-pressure SEM and image processing software and determined to have about 308 nm RMS surface roughness based on a sample size of five fibers, which is the standard against which surface roughness of the fibers is compared. A vertically extruded fiber cools symmetrically in air and its diameter is controlled by the diameter of the nozzle and the associated extrusion forces from the processing of the fiber. The surface roughness is dependent on the nozzle diameter. In the instant invention, fibers are extruded horizontally. The RMS surface roughness was found to be about 100 nm for fibers of diameters between 50 and 150 μm. Below 50 μm the surface roughness increases rapidly to over 600 nm for the 14 μm fibers as shown in FIG. 9A. This behavior can be quantitatively explained by the reduction in nozzle diameter increasing the force required to extrude the fiber. The inventors extruded fibers using six different nozzle diameters, and the surface roughness of five fibers from each nozzle was measured to find that the surface roughness as a function of the nozzle diameter x is described by the following equation:

$$\text{Surface Roughness} \propto x^{-1.136} \tag{10}$$

With the current LE-DPAM arrangement, multi-mode fiber diameters of 50-μm with RMS surface roughness of less than 100 nm were easily manufactured. The inventors have established that design changes to the printer head assembly, to reduce the extrusion forces, are required for printing single mode fibers of 10-μm diameter with acceptable surface roughness as shown in FIG. 9B. Reduction of filament diameter from the current 1.75 mm to 1 mm has been determined to be the most effective method for reducing the extrusion forces to below the established 5 N limit of extrusion force that produces acceptable surface roughness. Changes to other parameters such as extrusion speed to reduce the pressure drop are not possible because printing in the cladding material at such slow speeds degrades the cladding material. A new liquefier will be designed in future work.

In the evaluation of the fiber surface roughness, low pressure SEM was used due to the nonconductive nature of the PMMA material and the small feature size of the surface variation (see FIG. 10A). The RMS surface roughness was then characterized using image processing software from ImageJ, which was used to determine the edge of the fiber and then measured to determine the variation and the edge profile as shown in FIG. 10B.

Temperature is an important variable that is controlled during the printing process. The numerical simulation and experimental results indicated that surface roughness decreases as the temperature of the material in the nozzle is decreased to an optimum of 266° C., shown in FIG. 10C and corresponds to a polymer melt temperature of 115° C. exiting the nozzle. This correspondence can be qualitatively explained by the fact that the solidification process is faster, and therefore smoother, if the nozzle temperature is closer to the melt temperature of the polymer.

The traverse speed processing condition is important in that when the nozzle traverses across the cladding surface it must heat the cladding material enough to implant the fiber within the cladding but not to a temperature as to fully melt the cladding material. Another DOE based study was used to determine the optimum traverse speed of 10 mm/s as shown in in FIG. 10D. At speeds of less than 10 mm/s, the cladding material begins to flow, and the cladding structure no longer maintains its shape do to heating from the nozzle at slower speeds. Care was also taken to keep the cladding temperature below 93° C. as it may cause degradation of the material if kept above this temperature for extended time. The filament feed speed is important in the shear rate of the material being extruded and was optimized using Eq. (2), and another DOE yielded an optimum value of 0.03 mm/s as shown in FIG. 10E.

Homogeneous Heat Transfer

An important feature observed in the processing of FDM printed fibers is the effect of the temperature between the fiber and substrate being different. During typical deposition of horizontal fibers on a substrate, these boundary conditions result in non-uniform thickness in the fiber cross section. (Gantenbein, S., et al., *Three—dimensional printing of hierarchical liquid-crystal-polymer structures*. Nature, 2018. 561(7722): p. 226). Here, the fibers were evaluated by printing them horizontally between ledges over an air gap to eliminate the effects of the substrate on the surface quality and to establish optimum initial processing conditions in an easy to evaluate system. Fibers were then printed directly on an ABS substrate to determine the effect of non-uniform cooling of the fiber, which leads to non-round fibers where the bottom of the fiber is flat against the substrate, and fibers were also printed directly in a urethane cladding substrate with uniformly round fiber shape. FIG. 11A illustrates this for our fiber printed on the substrate. Finally, fibers were printed into the urethane cladding substrate where the urethane substrate was partially melted due to the low melting point verses the high nozzle and fiber temperature. The urethane cladding material then reflows back over the embedded fiber. The urethane material is completely encapsulating the fiber at this point. The uniform heat transfer, phase transformation of the cladding from a solid to a liquid and back to a solid, along with solidification of the fiber material reduces the inhomogeneous heat transfer. The cooling method is now a homogeneous type and results in a round fiber with less surface roughness as shown in FIG. 11B. To date, round fibers up to 100 mm in length have been printed with this LE-DPAM technology.

This embedded printing process is sensitive to how fast the extruder nozzle traverses the surface of the substrate as shown in FIG. 10D and the rate at which the raw PMMA filament is forced through the liquefier as shown in FIG. 10E. Minimizing the rate at which material is forced through the extruder and the rates at which the extruder deposits material results in smaller values of surface roughness, which therefore results in higher optical transmission rates.

Optical Transmission

An important result of achieving extremely smooth and round fibers is that it results in low transmission losses of data for communication applications. Fibers were evaluated at two different visible wavelengths of 532-nm and 632.8 nm for transmission. Average optical transmission power of 63% of that of a commercial PMMA fiber was realized with our system with the optical test set-up shown in FIG. 12B.

An advantage of using the LE-DPAM process to create an optical fiber interconnect is the ability to micro-dispense different cladding materials with different index of refraction (n) values to optimize the ability to route fibers in tight radii. The optical cladding material comes standard in different refractive indexes between 1.315 and 1.700. With this large range of standard materials, it is possible to custom design the interconnect to different bend angles and transmission qualities. Other core materials can be explored with different core materials with a higher refractive index like Cyclic Olefin Polymers (COP) with refractive index of 1.53 versus that of PMMA at 1.492. By utilizing the LEDPAM process, it is relatively easy to manufacture products with a range of core and cladding materials specifically suited for different applications.

CONCLUSION

The three-dimensional LEE-DPAM printing process enables additive manufacturing of polymer optical interconnects onto printed circuit boards. Using a transport analysis and thermal simulation along with experimental studies, the inventors have shown that smooth fibers can be produced by optimizing the additive manufacturing parameters. The inventors have also shown how embedding FDM printed optical fiber in the micro-dispensed cladding material creates a round fiber by homogeneous cooling of the fiber. And finally, it has been shown that by reducing the extrusion forces, single mode fibers of less than 10-μm diameter can be produced. By taking advantage of the capabilities of 3D printing, densely packed, application specific products can be manufactured with the proposed LE-DPAM process. By combining the tool path control provided by the 3D printer with the tunable capability of the micro-dispensed cladding materials, dense and complex interconnect geometries can be created. This new process opens the possibility to fabricate interconnected boards that can fulfill different performance requirements while ensuring optical quality.

The LE-DPAM process allows creation of smooth CCS fibers that allow for high transmission rates. The process also allows the difference in n-value between the core and cladding material to be easily changed to tailor the product to specific applications. For example, low Δn values for high transmission rates for relatively long-distance fibers and larger delta-n values allow the fibers to bend into a tight radius to allow for extremely dense packaging applications.

In terms of the combination of transmission and packaging capability, the LE-DPAM fibers surpass the properties of hand fabricated materials, rectangular Si IC manufactured fibers, and micro-dispensed only products. By taking advantage of the capabilities of 3D printing, new low cost, densely packed, application specific products can be manufactured with the proposed LE-DPAM process. By combining the tool path control provided by the 3D printer with the tunable capability of the micro-dispensed cladding materials, unparalleled levels of dense and complex interconnect geometries can be reached. This new process opens the possibility to fabricate interconnected boards that can fulfill different performance requirements while ensuring optical quality.

Example 3—Printing on a Flexible Substrate

The inventors have developed a novel contact printing methodology based on additive manufacturing processes that allows for printing of optical fiber interconnects in three-dimensions on flexible substrates. The novel contact printing platform, termed Additive Manufacturing of Flexible Optoelectronics (AMFO), exploits the capabilities of novel additive manufacturing techniques to print flexible optoelectronics that include sensors, optical interconnects, and imaging devices.

The inventors demonstrate the capability of AMFO by utilizing the laser enhanced direct print additive manufacturing (LE-DPAM) process to manufacture fully functional circular cross section (CCS) plastic optical fiber interconnects on a flexible substrate where all the manufacturing steps are completed in the same multi-function LE-DPAM automation. The LE-DPAM process described in Example 2 is slightly modified for its novel use with flexible substrates. Broadly, a micro-dispenser is used to print cladding material on a flexible substrate. The new step comprises micro-dispensing an acrylonitrile butadiene styrene (ABS) adhesive material onto the flexible substrate to assist in bonding the optical fiber to the substrate. Fused deposition modeling (FDM) is used to embed an optical fiber in three-dimensions into the cladding. Finally, a laser is used to ablate the end facets.

With the three-dimensional method, no mirrors or gratings are needed for getting the light out of the plane of the substrate. This Example demonstrates a new class of flexible optoelectronic contact printing using additive manufacturing techniques and the optical performance of optical interconnects fabricated using the novel additive manufacturing contact printing methodology.

Illustration of the Optical Device

The flexible photonic devices were fabricated using a LE-DPAM process where all the additive and subtractive manufacturing steps are completed in the same multi-function LE-DPAM automation. This is a shape deposition manufacturing (SDM) process where complex parts are made by combining material with additive and subtractive processes. (nishikc. *Naval Research Reviews: Three* 1998; Williams, C. B., Mistree, F. & Rosen, D. W. A functional classification framework for the conceptual design of additive manufacturing technologies. *J. Mech. Des. Trans. ASME* 133, (2011); Blake Perez, K. & Williams, C. B. *Combining Additive Manufacturing and Direct Write for Integrated Electronics-A Review*).

The novel process is depicted in FIG. 14A-E. As illustrated in FIG. 14A, first, a layer of a UV-curable optical adhesive blend of aliphatic urethane acrylate and acrylate monomer cladding material is micro-dispensed on a flexible substrate. In some embodiments, the nScrypt smart pump system is used for micro-dispensing the liquid cladding material onto the flexible substrate, however other micro-dispensing systems are contemplated. The SmartPump system is equipped with a pump for releasing or terminating materials dispensing precisely with no tailing. A large range of viscosity, from 1 cP to 1 million cP, can be operated by this system due to its strong compatibility. The system works with over 10,000 kinds of commercial material and features volumetric control correct to 20 picoliters. A syringe containing optical adhesive is connected to the mount of the micro-dispensing system and linked with a pressure supply from the other side. The optical adhesive is pushed into the mount and driven down to the top surface of the workpiece, passing through the nozzle used for dispensing.

As shown in FIG. 14B, the cladding material is then cured with UV energy to create a solid but still flexible cladding material. In some embodiments, a black-ray UV lamp is used for curing, however other means of UV curing are contemplated. In some embodiments, a Black Ray long wave ultraviolet lamp (UVP company, Model B-100 AP/R. 11) was used. The lamp is equipped with a special heat-resistant plastic Cool-Touch Tm housing which allows users to handle the lamp head regardless of how long the lamp has been operating. These rugged lamps can be placed face down on a working surface without damage to the filter. A 100-watt spot bulb is equipped and rated at 5000 hours.

An adhesive material, such as ABS, is then micro-dispensed onto the flexible substrate to assist in bonding the optical fiber to the substrate and act as a starting and end point for the optical fiber. (FIG. 14C). This adhesive material is allowed to dry prior to the next step.

Next, as shown in FIG. 14D, an optical fiber of polymethylmethacrylate (PMMA) is printed into the bulk of the cladding material using fused deposition modeling (1-DM). (P.V. Thorat P. A. Thombre, S. W. Plastic Optical Fiber. *Int. J. Eng. Res. Rev.* 2, 95-104 (2014). In some embodiments, the nFD system is used, however other FDM systems are contemplated. The nFD system is controlled by a highly precise computer system that can realize accurate movement along the XYZ axes correct to 0.001 mm. The system consists of a filament feeding section, a liquefier with temperature control, and a changeable tip set, which makes changing tips convenient. Printing with different thermoplastic materials at various sizes for specific requirements is achievable by switching to the proper nozzle. Two thermocouple slots are equipped with the nFD system for temperature control and safety limiter, respectively. Common thermoplastic materials, such as ABS and PMMA, are compatible with the nFD system due to its wide operating temperature range.

Finally, the end facets are laser ablated with a picosecond laser. (FIG. 14E) In some embodiments the Lumera Super Rapid laser is used, however other lasers are contemplated. The Lumera Super Rapid laser has a pulse width at the picosecond level. The laser is comprised of three main components: a laser head, control units and a chiller. Pulses can be emitted with energy higher than 120 IA and length within a range from 7 to 10 picoseconds. The repetition rates of pulses can reach to 1 MHz and the normal wavelength locates at 1064 nm. It has three achievable spectral regions including visible green spectral region (second harmonic, 532 nm), non-visible UV region (third harmonic, 355 nm) and non-visible UV region (fourth harmonic, 266 nm) which can be converted from the infrared pulses. The inventors used the wavelength at 355 nm, which is the third harmonic generation produced by frequency tripling the fundamental beam (1064 nm) with a nonlinear crystal being integrated, which converts the doubled radiation and the residual infrared radiation (1064 nm) to ultraviolet laser radiation to achieve the wavelength of 355 nm by sum-frequency-mixing. The quality of the area after laser machining can be very high due to the short pulse width which leads to the process with a relatively low temperature that would not introduce thermal side effects such as microcracks, recast, or burr. This laser has a quite high resolution and wide compatibility with various materials that different operations like scribing or cutting can be achieved, correct to the µm/nm range.

The flexible substrate is then ready to be populated with optical sensors and components. The integrated LE-DPAM automation completes the entire process of micro-dispensing, FDM printing, and laser subtraction in the same machine without the complex material handling and registration of other hybrid systems. (Ambriz, S. et al. Material handling and registration for an additive manufacturing-based hybrid system. *J. Manuf. Syst.* 45, 17-27 (2017)

Focus Point Locating

With respect to the laser cutting, the laser comes out from the objective lens and hits onto the position for cutting. However, there is a very small range along its path that only when the sample is moved into this range can the sample be cut by the laser. This range is referred to as the focal range with the middle of the focal range being the focus point having the highest energy which works the best for cutting. Determining the exact focus point for the samples was difficult due to their colors. The optical adhesive and the PMMA core are transparent. Similarly, the Kapton substrate is relatively transparent even though it is red in color. These factors decrease the possibility of distinguishing whether the laser cut mark is at the PMMA core.

The inventors located the focus point of the Kaptron substrate as its red color gives a more obvious sign of the laser-cut area. The principle for confirming the focus point of the laser beam is to cut and move the "beam" both along the X and Z axis, or Y and Z axis, at the same time. The beam movement is realized by the work stage movement along the X or Y axis and objective lens movement along the Z axis.

The cutting trace on the Kapton substrate is obvious by focusing on only a specific short part of the whole movement, which particularly refers to the period when the top surface of the Kapton substrate is involved in the range of good focus. The middle point of this trace should be the focus point, however the exact position along the Z axis is needed. This can be calculated by using the relation between movements along the X/Y axis and Z axis to calculate this height. Expressed as the equation below:

$$z_f = z_i + \frac{(x_m - x_i)z_\omega}{x_\omega} \tag{11}$$

where zf refers to the position of focus point along the Z axis, zi and xi refer to the initial position of the movement along the Z and X axis set in the script, zω and xω refer to the whole distance of the movements along the Z and X axis, and xm is the value measured from the middle of the cutting trace.

In order to increase accuracy, this focus point locating program is run and repeated with the steps above several times. After every round, the value for the focus point used in the script is replaced and the routine range around it is reset. Before laser cutting, this process is done for accurately locating the focus point for that position at that time of using.

Utilizing the focus point of the Kapton substrate the focus point for the core fiber can be calculated with help from SEM characterization. Taking the diameter of the additively manufactured fibers measured by the SEM imaging as a reference, with the distance between the nozzle of FDM and the top surface of Kapton substrate also taken into account, the value for how high the focus point of the laser beam should be over the Kapton substrate can be obtained to cut right in the middle of the PMMA fiber.

Laser Cut Parameters

For laser cutting, even if the focus range is properly located and adjusted to the desired position, the final effect is still influenced by some very complex factors including beam traverse speed, laser power output, and beam paths.

The end facets should be as smooth and flat as possible to meet the requirement for light transmission with less reflective and diffractive loss. Considering the property of the optical adhesive and PMMA fiber, which could be easily deformed by the thermal effect of the laser beam, the heat transfer time during this cutting process should be decreased to the lowest that finally directs to the maximum traverse speed allowed for the 3D Table Top equipment. The speed of 50 mm/s is used within all the laser cutting programs. The inventors determined the real power output at different power settings and repetition rates as shown in Table 3 below:

TABLE 3

Real power output (mW) at different power settings and repetition rates (kHz)

| Power Setting | 100 kHz | 250 kHz | 500 kHz |
| --- | --- | --- | --- |
| 0.5 | 22.00 | 7.22 | 4.14 |
| 1.0 | 77.90 | 33.40 | 16.44 |
| 1.5 | 189.50 | 89.10 | 45.30 |
| 2.0 | 361.00 | 198.00 | 99.60 |
| 2.5 | 581.00 | 356.00 | 180.10 |
| 3.0 | 834.00 | 562.00 | 296.00 |
| 3.5 | 1098.00 | 811.00 | 449.00 |
| 4.0 | 1349.00 | 1090.00 | 631.00 |
| 4.5 | 1584.00 | 1414.00 | 845.00 |
| 5.0 | 1791.00 | 1690.00 | 1065.00 |
| 5.5 | 1966.00 | 1976.00 | 1288.00 |
| 6.0 | 2105.00 | 2219.00 | 1516.00 |

Figure 15:
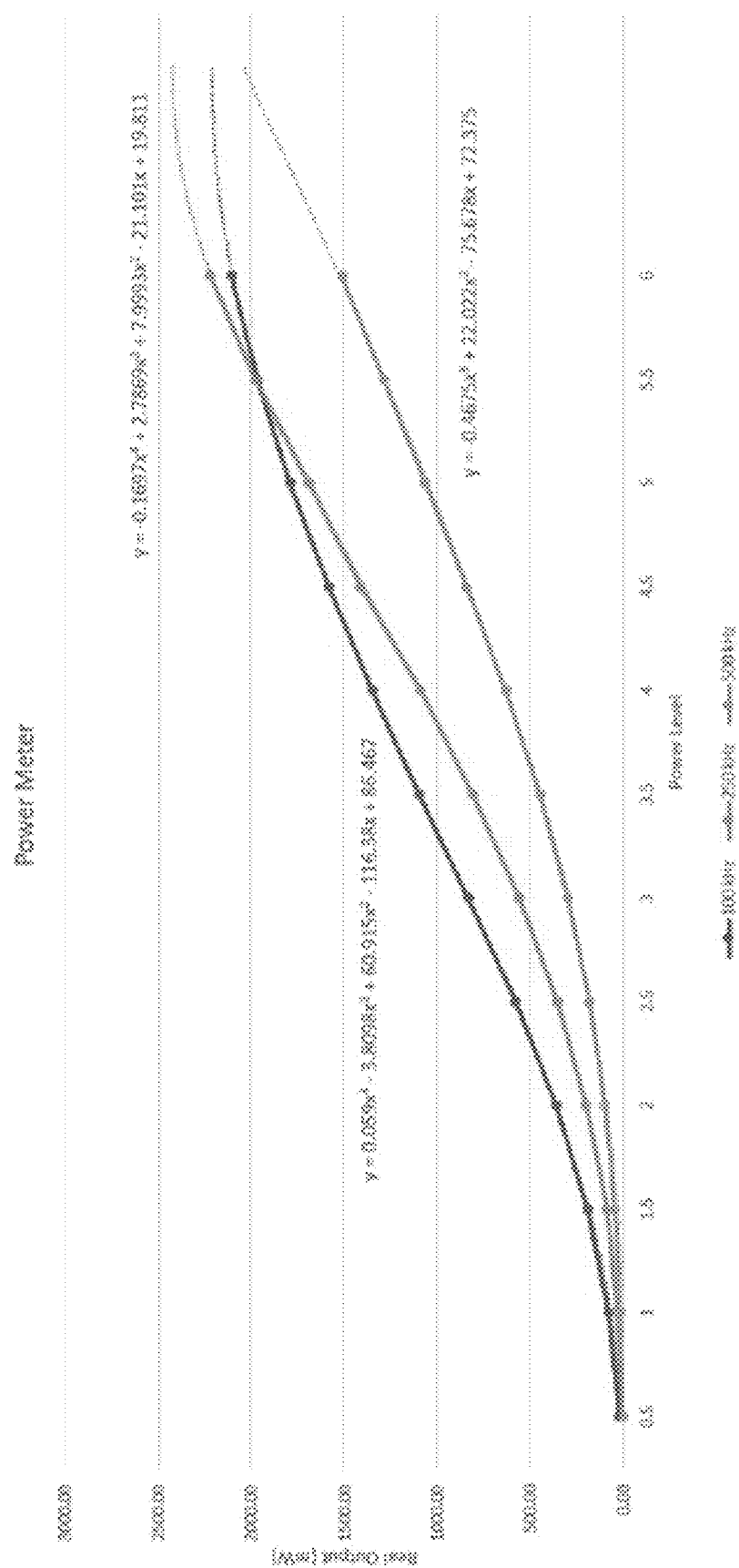
FIG. 15 is a graph depicting the function of real power output and power level.

Using this data, FIG. 15 shows the function between real power output and power levels at different repetition rates which assists in setting the desired power level corresponding to the desired real output.

Samples were cut with the designated power output and paths and images were captured utilizing the main camera of the 3D TableTop and optical microscope. (FIG. 16A-F) As shown in FIG. 16A-C, under the main camera, only shallow traces on the optical adhesive can be seen at 400 mW (a); cutting to some depth into the adhesive and the fiber but not separated completely at 1000 mW (b); and thorough cut-off with the fiber completely divided at 1400 mW (c). Utilizing an optical microscope at its higher magnification, the transparent fiber and adhesive allowed too much light to pass through and only the metal sheet beneath was well observed. However, it was observed that the traces were wider and deeper at higher power output and numbers of cuts. Since none of the images were sufficiently clear to view the end facet flatness due to the lower resolution, the inventors used scanning electron microscopy (SEM) to characterize the surfaces.

A low vacuum scanning electron microscope was used to observe the end facets. A low vacuum SEM was chosen because water molecules are spread on the surface which overcomes the lack of conductivity of the samples.

The SEM images were taken from the top view of the cutting. As shown in FIGS. 17A-C, basically, the gray background represents the optical adhesive with fiber coated inside which is not visible. Fibers go from top to bottom and the laser cuts transversely which left the cracks quite obvious in the pictures. Although the adhesive reflows back after laser cutting, the covering on the fiber end facets is decreased due to the mechanical tension between fiber and adhesive. The results shown in table 3-2 are acquired using both images taken by the main camera and SEM. The fiber and adhesive are transparent and only the substrate is almost transparent but has a little red color which allows the laser to leave a black cutting trace. Furthermore, the scale bar was used to measure the cutting edge in the SEM image and compared with the known diameter at 70 microns of the fibers. Only cuttings above this length with black trace could be recognized as fully cut.

All the images got from SEM were analyzed using the processing tool ImageJ to profile the end facets and compared to acquire the optimum combination of power output and paths. Several representative data points are selected that their SEM images and related end facets profiles are illustrated in FIG. 18A-F.

As shown in the SEM images, fibers are clearly recognized as being cut off. This range is shown as located from 1000 mW to 1500 mW power output. While power output higher than 1500 mW is likely able to cut the end facets, consideration needs to be taken with respect to damage to the metal sheet under the flexible substrate. As shown in FIG. 18A-F, cuttings were conducted at 1200 and 1400 mW with three paths. It was found that 1400 mW was optimal. Given that 1200 milliwatt had a very clear view of unsuccessful cutting, it was selected for comparison. Using the previously enumerated method which includes the scale bar of SEM and trace color from main camera images, the inventors obtained the results shown in Table 3. By transferring these images into the 8-bits color mode, the cutting area was chosen and plotted by recognizing the grey value. The shape of the separated edge was then profiled and shown in the graph under each parameter combination of FIG. 18A-F. The dimension measured is pixels which could be transferred to microns by setting scale function. All the SEM images have the same format and dimension with the ratio being about 3.1 pixels to 1 micron.

In these profile graphs, the X-axis represents the length chosen to be analyzed. The Y-axis represents the length along the direction of fiber which has some peaks describing the topography of the end facets. The flatness of the end facets was characterized by the fluctuation range of these peaks which illustrates the surface height variety. Most peaks are located within a range of about 20 microns. More stable or flat areas were found for some cuttings as fluctuating within about 5 microns. The proportion of these flat areas was then compared with the result for the optimum parameters given by 1400 mW for power output and 2 times for the number of cuts. From the profile graph of this data point, the relatively flat area with the value difference along Y-axis of less than 5 microns is around 30 microns long, which is almost half of the fiber diameter.

Optimizing the parameters for laser cutting allows the samples to be laser cut smoothly to decrease the effect of deformation. A razor blade may be used to cut off the connected substrate. Although the laser can cut the whole length of the substrate, the stainless steel plate beneath could potentially be cut as well, which would affect the plate being used again due to the superficial crack. Once the sample is separated on both sides, transmission tests were conducted.

Initial Transmission Testing Through a Bent Fiber Assembly

Sample Preparation and Components Alignment

For the transmission test, samples, after laser cutting at the two ends, were separated by two cutting traces at 1 mm length whose middle points were located right on the fiber. Hence, only the optical adhesive and substrate around the sample were still connected. The razor blade was used to cut off the rest of the adhesive and substrate along the two ends of the cutting trace. Moreover, the razor blade was used to cut parallel to the fiber allowing some margin for the sample mount. The samples were pulled away from the needless substrate to reveal a rectangular substrate beneath.

An HeNe laser with the wavelength at 632.8 nm was used. Mirrors and lenses were used to direct the laser to the sample on the test platform. All the components were adjusted one by one to make sure that the laser hits right on the center of each component to be directed into the center of the objective lens. Once all of the components, except the lens next to the objective, are fixed, the distance between the two lenses was decided by moving that lens along the line connecting the mirror and objective. Normally it should be the value marked on that lens, but this step is to better confirm that the power output to the objective and the sample is the highest without much loss across the system. This lens was then fixed as well.

The sample was not tested in a normal way due to the flexible substrate and bend requirement. The sample mount must enable two operations. First, in consideration of the bending step during the test, the sample or the flexible Kapton substrate must be mounted perpendicular to the top surface of the test platform. This allows the bending movement to only occur in the plane that is horizontal to the platform, i.e. the fiber is kept at the same height, no matter how it is bent to align the lenses, pinhole, and detector.

Second, the sample mount must allow movement along the three axes and satisfaction with angle adjustment. The common test platform has rails along three axes that allows the sample to move spatially. A circular test base was mounted on the common test platform which allows for rotation of 360 degrees. An optical breadboard was mounted on the circular test platform. The threaded holes on the optical breadboard were used to attach several accessories including plates, pedestals, and a cylindrical supporter. The flexible Kapton substrate was clamped on the closest side to the objective lens by the cylindrical supporter and the lower part of the pedestal. The circular base under the breadboard allows for adjustment of the fiber to ensure accurate connection with the laser coming out from the objective lens. During the test, the far side of the substrate can be manually pushed to realize the different bend radii. A u-shaped part can be used to push the substrate without touching the optical adhesive and fiber because of its hollow appearance.

Transmission Test

After the sample is mounted, with the inlet of the fiber positioned as close to the outlet of the objective lens as possible, the alignment of the objective lens, fiber, pinhole, and detector is rechecked by moving to the top view and adjusting the circular test base until the inlet of fiber is perpendicular to the laser light. This operation needs to be done every time the position of the sample is changed. The normal incident light is extremely important for achieving the highest power output.

The curved length during bending is crucial to the whole transmission test. Although each sample was controlled to be fifty millimeters long, the sample was initially found to be curving unthoroughly due to its fixed situation between the cylindrical supporter and the pedestal. It is important to acquire the real curved length which determines the final bend radius. Pictures were taken from the top view and ImageJ was used to analyze and measure the straight length. The difference between straight length and sample length is the curved length.

When doing the transmission test, several steps are required to ensure the accuracy of the measurements. The sample should be moved along axes perpendicular to the light path until a focused light is shining in the adhesive on the substrate. During initial attempts, it was extremely difficult to locate this focused shining line due to the much smaller diameter of the PMMA core compared with commercial fibers, as well as the lack of power output from the objective lens. After realigning the components and readjusting the distance between two lenses, the power output from the objective lens was high enough to show a clear shining line, indicating that the incident light is shining through the fiber instead of passing through the optical adhesive. An alternative method to determine whether the light is well located uses a piece of paper to block the front of the pinhole. A focused point on the paper reflects shining through the fiber. No focused light on the paper represents missing the fiber. However, this method must be used for a status close to straight because a short line may show up on the paper due to diffraction caused by the optical adhesive when dealing with curved angles.

For the optical transmission test, the most important thing is addressing the light path. The light path begins at the laser source, passes through mirrors, lenses, the testing fiber, pinhole, and finally goes into the detector. The pinhole is the last point that its center has to be precisely aligned with the light coming out from the fiber. It must be adjusted to the smallest status with a diameter at 200 microns and placed as close to the outlet of the fiber as possible in order to decrease the diffractive distance but still block all the diffracted light, which significantly increases the difficulty of the connection in the air. The minimum distance between the pinhole and the outlet of fiber is about 1 cm to 2 cm due to the limitation of the test platform. The pinhole cannot be moved closer because its cylindrical supporter is already touching the edge of the platform.

Figure 19:
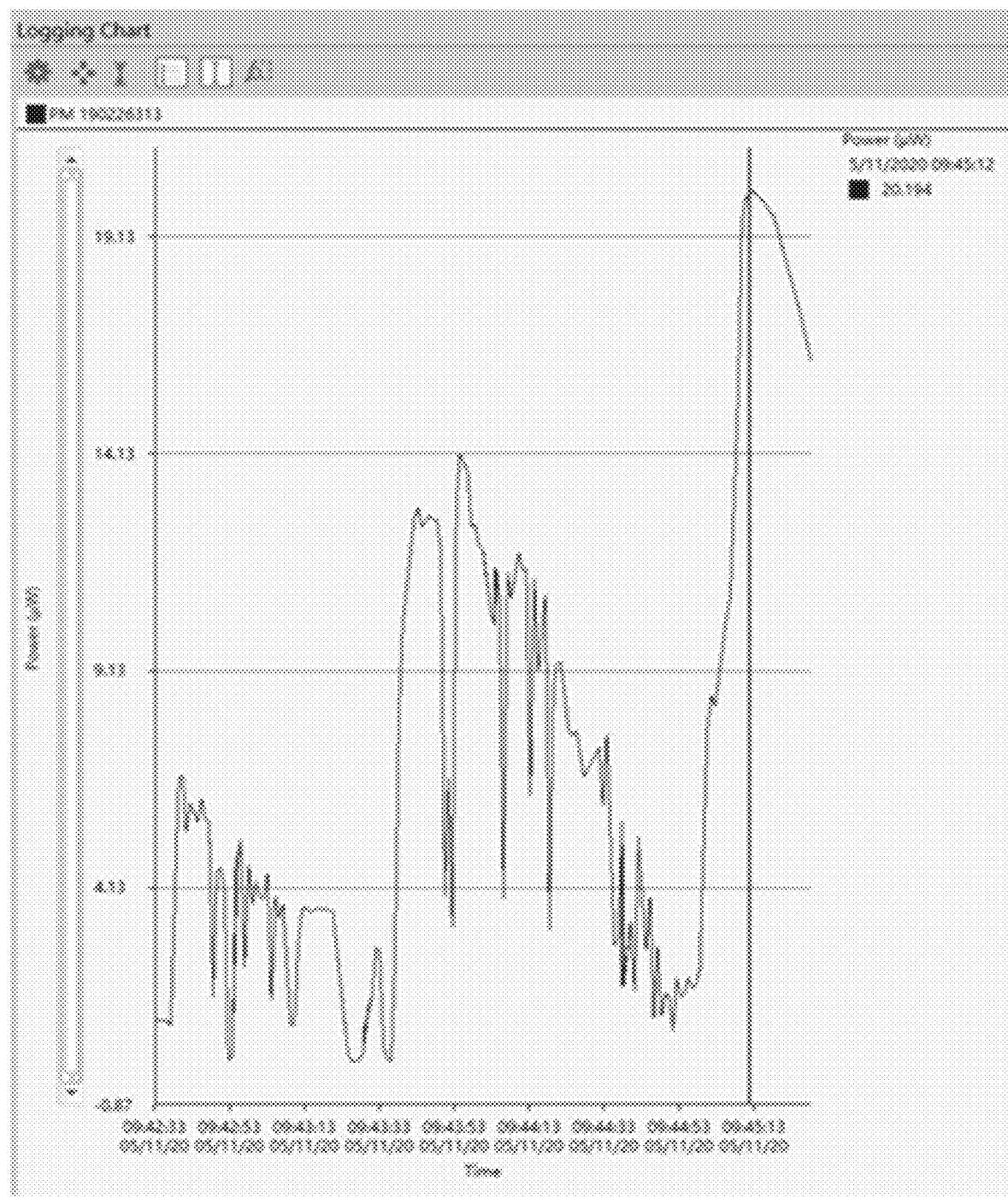
FIG. 19 is an image depicting real-time power plotting results with the highest reading.

The Thorlab Optical Power Monitor software was found not only to record the power detected on the detector, but also to plot the real-time value changing trend. The pinhole was first moved to a position that roughly perpendicular to the outlet of the testing fiber with a ruler. The plotting function was started while the pinhole was slightly moved around that position, including movement along the horizontal normal of light path and rotation. The curve illustrated in FIG. 19 clearly shows that the highest value detected represents the desired position and vertical angle needed for the pinhole. The detector does not need to be moved like the pinhole because it should always be close to the latter with the parallel relation which can completely receive the light penetrate the center of pinhole and indicate the power reading detected. The highest value shown in the curve plotted also represents the power at that bend angle collected with a picture of that bend status taken from the top view. The pictures are analyzed by ImageJ to measure the exact angle bend.

The data processing was done by Microsoft Excel with power and angle inserted. Angles need to be transferred to bend radii utilizing the equation:

$$R = \frac{360 L_c}{2\pi\theta} \qquad (12)$$

where Lc represents the curved length measured for each fiber by ImageJ before and $\theta$ represents the angle bend.

The dB Loss is derived from the power changing ratio utilizing the equation:

$$\text{Loss}_{dB} = -10\log_{10}\frac{P_m}{P_R} \qquad (13)$$

where Pm refers to measured power, PR refers to reference power, and the negative sign represents the power decreasing trend.

By using the loss equation, the loss related to each measured power at a particular bend radius for that prototype can be calculated. The power measured for each particular sample initially without any bending was considered as the reference power of that sample in the equation. The power at each bend radius was measured ten times with the sample being released to straight and subsequently bent back to that marked position. The measured power then was taken from the arithmetic mean of those ten values.

Figure 20:
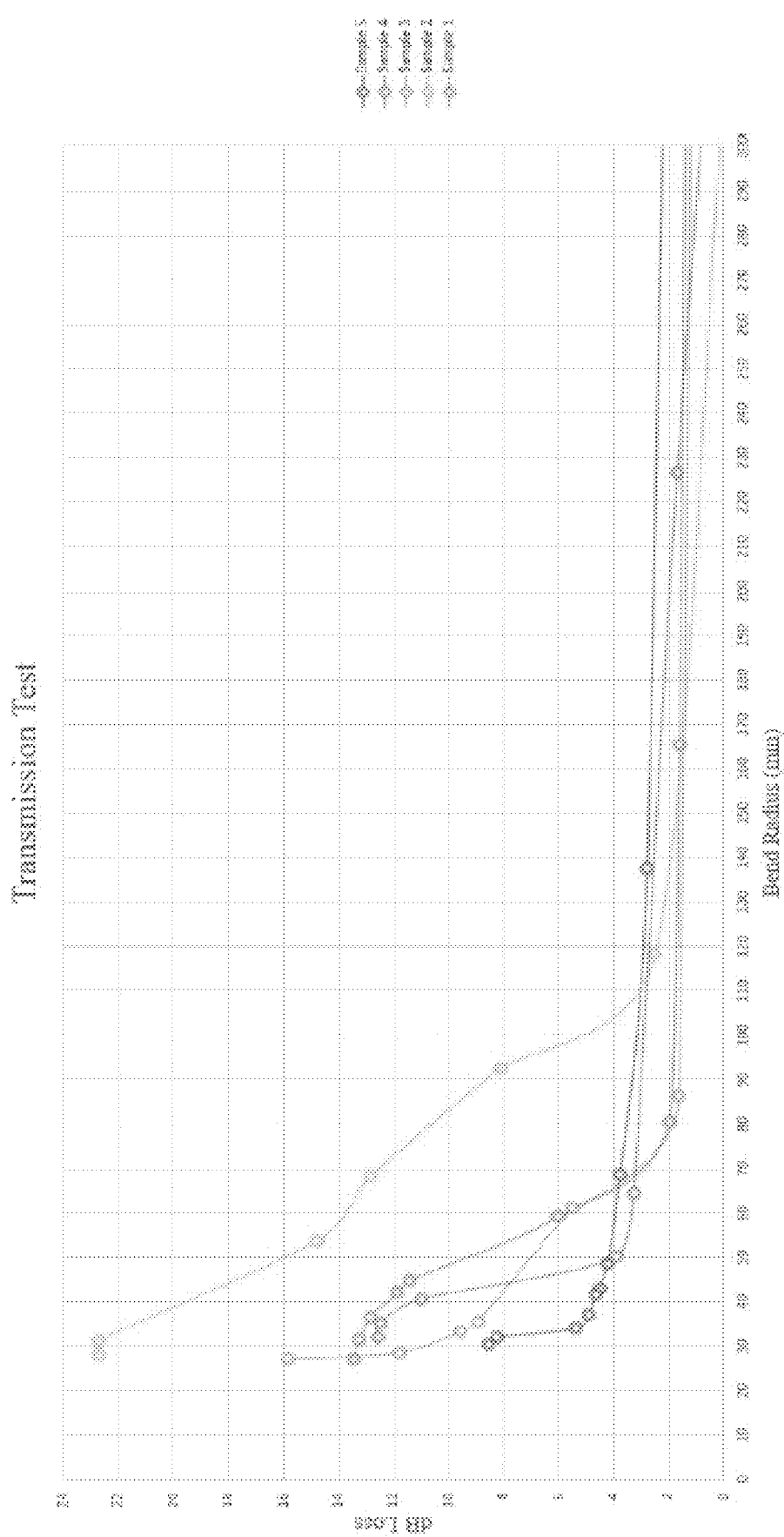
FIG. 20 is a graph depicting the dB loss vs. bend radius curves for different samples.

FIG. 20 shows the testing of fibers being processed with the best parameters combination discussed previously. Loss calculated at different bend radii with individual reference power was plotted and the dimension dB/cm was used to explain the transmission loss per unit length of the fibers. The loss on the Y-axis was divided by 5 cm, which was the length of the prototype. From the data, the loss starts from 0.4-0.8 dB/cm, which refers to the initial position without bending. It begins to increase at a relatively small slope as the bend radius decreases until a particular range which is found to be 30 to 80 mm. The loss shows a rapid climb trend that the exact value jumps from about 0.8 dB/cm to a range within 2.5 and 3.2 dB/cm for different samples which means the power measured smaller than this bend radius range has reached 1% to 1%0 of the reference power.

During the test, the influence of all kinds of environmental light was decreased as much as possible by blocking or turning off. The power reading with laser off was shown at 0.09 microwatt which approximately equals to 2% to 10% of the value with the laser turned on.

Simulation of Light Transmission Through a Bent Fiber Assembly

The numerical simulation was conducted on just a core and cladding assembly to determine the theoretical maximum bend performance with the large difference in index of refraction (An) of 8.2% of the core and cladding material selected for this study. A ray tracing method utilizing finite element analysis (FEA) was used to predict the optical transmission performance of the bent plastic optical fibers. The FEA model was based on actual structures made by the LE-DPAM process where a 50-μm PMMA fiber with an n of 1.492 was embedded into a 100 μm aliphatic urethane acrylate and acrylate monomer cladding material with an n value of 1.369 was bonded to a 125 µm polyimide film (Kapton). The simulation was conducted in COMSOL Multiphysics 5.3 with the Ray Optics solver package. This high difference in index of refraction between the fiber and the cladding material was chosen to optimize the bent fiber performance of the devices. Bent fiber models were created from a radius of 250 mm down to 0.25 mm and evaluated for optical transmission in dB loss per cm of fiber length with a 632 nm wavelength laser. Simulation indicates low loss conditions are possible down to less than 0.7 mm with this fiber assembly design, see FIG. 2A-E.

The critical radius is the bend radius below which loss increases rapidly. For a multimode fiber, the critical radius is given approximately by:

$$R_c = \frac{3n_f^2 \lambda}{4\pi(n_f^2 - n_c^2)^{\frac{3}{2}}} \quad (14)$$

With the materials and wavelength, one would expect a theoretical critical radius of about 0.674 mm which corresponds closely with our ray tracing FEA simulation. At a bend radius below this losses would increase rapidly which compares favorably with Shibata and others with maximum bend radii of over 1.63 mm (Shibata, T. & Takahashi, A. Flexible opto-electronic circuit board for in-device interconnection. in *Proceedings—Electronic Components and Technology Conference* 261-267 (2008)). The ability to easily vary the n value of the core and the cladding presents an opportunity to optimize the interconnect for different applications. The optical cladding material comes standard in different refractive indexes between 1.315 and 1.700. With this large range of standard micro-dispansable materials, custom designed interconnects can be optimized to different bend angles and transmission qualities. Other core materials could be explored with a higher refractive index like Cyclic Olefin Polymers (COP) at 1.53. By utilizing the DPAM process of FDM printing it is relatively easy to manufacture products with a range of core and cladding materials specifically for different applications. (Tipton, R. B. *Direct Print Additive Manufacturing of Optical Fiber Interconnects*. Scholar Commons, Graduate Thesis, 2018).

Intermodal dispersion is an important topic in signal transmission in optical fibers that is caused by multipath propagation of light energy. Signal degradation occurs due to different values of group delay for each individual mode at a single frequency. As different waves travel down a fiber at different angles they arrive at the end of the fiber at different times. This change in time can distort a signal. The change in time is indicated by:

$$\Delta t = \frac{L n_f}{c}\left(\frac{n_f}{n_c} - 1\right) \quad (15)$$

where L is the length of the fiber at 5 cm, c is the speed of light, $n_f$ is the index of refraction of the fiber, and $n_c$ is the index of refraction of the core. With our parameters the $\Delta t$ is equal to 0.024 ns. (Hecht, E. Optics. 204-212 (2016). The available bandwidth can be estimated as:

$$B \cong \frac{0.44}{\Delta t_{mod}} \quad (16)$$

where the bandwidth of the 5 cm flexible optical fiber is 18.3 GHz. (Kaminow, I. & Li, T. *Optical fiber telecommunications IV-B: systems and impairments*. vol. 2 (Elsevier, 2002)). With this high $\Delta n$ interconnect, the interconnect can be bent significantly without transmission losses and with high bandwidth operations on our short length fibers.

Substrate Thickness Optimization

Mechanical flexibility, measured by maximum bending radius, without structurally damaging the photonic devices is determined by yield strength of the materials that are used to build the device as well as the device design which specifies the strain exerted on the device during that bend radius. The basic design recipe for improving flexibility is to minimize the strain of the photonic device layer at the given mechanical deformation. There are several design strategies that we can employ to improve the mechanical flexibility of the photonic devices. A neutral plane strategy utilizes a multi-layer structure where the central plane, where the fiber is located, has no strain. Another configuration is a single plane device on thin flexible substrates with low elastic modules which minimizes the strain level in the fiber device layer. (Hu, J. et al. Flexible integrated photonics: where materials, mechanics and optics meet. *Opt. Mater. Express* 3, 1313-1331 (2013)). This single layer device design was selected for ease of fabrication in the current work.

Figure 21A:
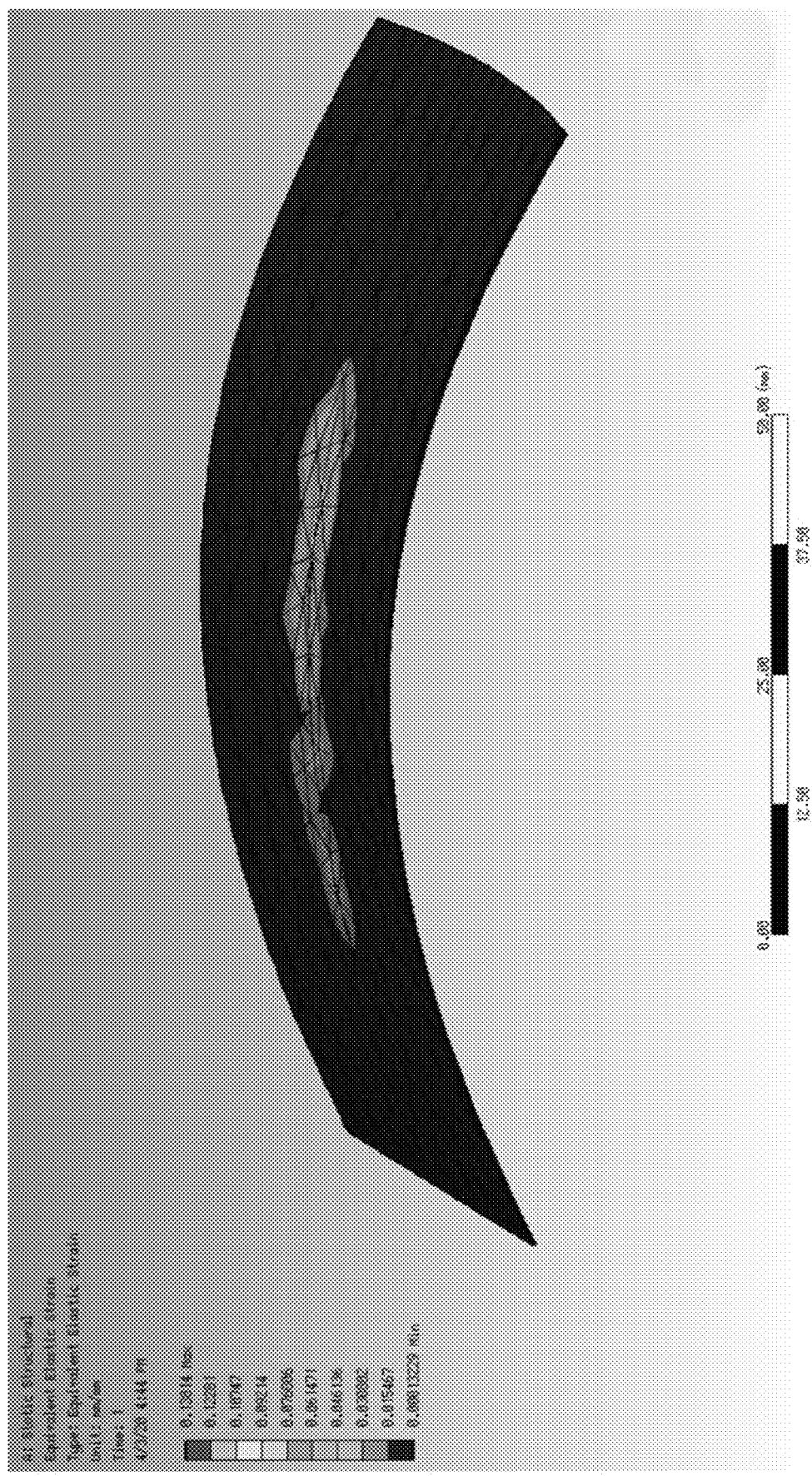
FIG. 21A-B are a series of images depicting mechanical flexibility simulation of an optical fiber on a flexible substrate and performance with different substrate thickness. (A) Numerical bend simulation with a remote displacement of 30° on a 50-µm diameter fiber on a 125 µm substrate with a strain rate of less than 0.025 mm/mm; (B) Strain performance for 50-µm versus a 125 µm substrate indicating that thinner substrates will result in less strain in the optical fiber interconnect assembly.
Figure 21B:
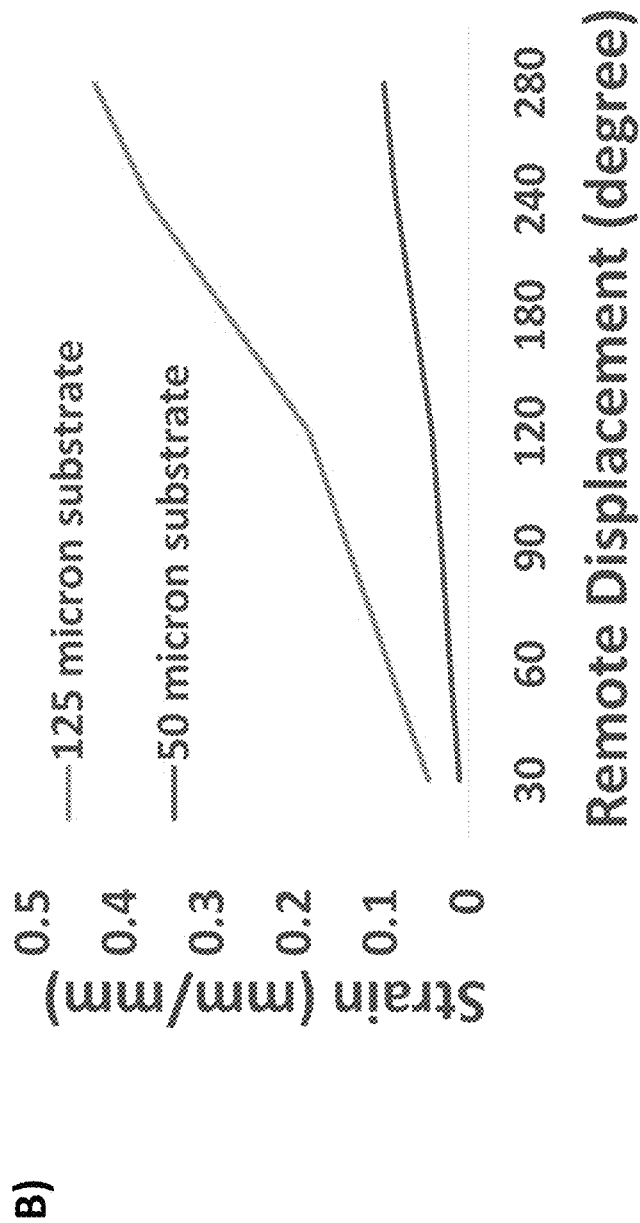

A finite-element analysis (FEA) method was used to predict the induced strain in the photonic structures on flexible platforms during substrate bending. The FEA model was based on actual structures made by the LE-DPAM process. To simulate the bending stress on the polyimide, a bending moment M, is applied on the ends of the substrate, is first determined from the Stoney equations, $$M = \frac{Ed^3 w}{12R} \quad (17)$$

where the radius of curvature between 0 and 45 mm, E is the elastic moduli is 4.0 GPa, d is the substrate thickness of 125 µm, and w is the substrate width of 50 mm (Asad, M. et al. Optically invariant InGaN nanowire light-emitting diodes on flexible substrates under mechanical manipulation. *npj Flex. Electron.* 3, 1-6 (2019); He, W. et al. Study on Young's modulus of thin films on Kapton by microtensile testing combined with dual DIC system. *Surf. Coatings Technol.* 308, 273-279 (2016)). The calculations show the stress within the fiber structures to be nearly zero, suggesting that the active region near the fiber should not experience induced stress fields during low to moderate bending of the substrate that may degrade the transmission characteristics of the fiber optic core. FIG. 21A shows the FEA simulation of the strain distribution within the substrate and cladding and core structures having a similar performance in compression and tension bending tests.

The FEA model shows a stress-induced strain gradient with a strain of less than 0.20 mm/mm at a remote displacement of 120 degrees. A thinner substrate results in a lower strain condition but warping can be introduced, due to the embedded hot fiber. Warping of about 0.10 mm are predicted by a transient mechanical numerical simulation with a 125 µm substrate versus 0.44 mm are predicted for a 50-µm substrate. A summary of expected warpage at different substrate thicknesses is presented in FIG. 22A-D. Processing procedures can also be changed to reduce warpage including fabricating the flexible interconnects on stainless steel sheets and allowing them to fully cool down to room temperature before removing. This reduced the warpage but left residual stress in the assemblies. These results indicate that substrate thickness will need to be considered as a design constraint and the process optimized to reduce warping or reduce strain based on the application.

Experimental Optical Fiber Results

Experiments were conducted where optical fiber interconnects were manufactured on flexible substrates using the LE-DPAM process. Fibers fabricated using the LE-DPAM process were tested using a 632.8 nm helium-neon laser test station and evaluated for transmission loss. Interconnects were also evaluated for bend loss at different radii and bend fatigue up to 1000 cycles. The loss in the proof of concept fibers is less than 1 dB/cm down to about a fiber bend radius of 35 mm, at which point rapid degradation of the signal occurs.

The current proof of concept fiber transmission performance under mechanical bending is the same shape and two orders of magnitude away from the predicted theoretical transmission rates from optical simulation. Improving this performance under bending is the topic of future work. The current device design is built on a 125 µm Kapton substrate. While this is a convenient material for building the prototypes, a thinner 50-µm Kapton substrate material will provide a lower strain design and improve the mechanical flexibility performance of the photonic devices. A neutral plane design could also be implemented as another design for reducing strain in the design and improving optical transmission performance.

The LE-DPAM process allows us to create smooth CSS fibers that allow for high transmission rates. The process also allows us to change the difference in n-value between the core and cladding material to tailor the product to specific applications. For example, low Δn values for high transmission rates for relatively long-distance fibers and larger delta-n values allow us to bend the fibers into a tight radius to allow for extremely dense packaging applications. In terms of the combination of transmission and packaging capability, our LE-DPAM fibers surpass the properties of manual assembled materials, rectangular Si IC manufactured fibers, and micro-dispensed only products. By taking advantage of the capabilities of 3D printing, new low cost, densely packed, application specific products can be manufactured with the proposed LE-DPAM process. By combining the tool path control provided by the 3D printer with the tunable capability of the micro-dispensed cladding materials, we can develop dense and complex interconnect geometries. This new process opens the possibility to fabricate interconnected devices that can fulfill different performance requirements while ensuring photonic performance quality. This composite additive and subtractive manufacturing process, LE-DPAM, has been used to create new flexible phonic devices. We expect this new technology can be used to develop a whole new class of electro-photonic flexible devices.

Materials and Methods

Materials and Device Fabrication

LE-DPAM is an additive and subtractive composite manufacturing process. (Rojas-Nastrucci, E. A. et al. Characterization and modeling of K-band coplanar waveguides digitally manufactured using pulsed picosecond laser machining of thick-film conductive paste. *IEEE Trans. Microw. Theory Tech.* 65, 3180-3187 (2017)). For this experiment, a commercially available printer, the nScrypt 3Dn-Tabletop with an additive micro-dispenser, an additive FDM printer, and a subtractive picosecond laser is used to fabricate samples.

Processing parameters used in the experiments are given in Table 4 below:

TABLE 4

Processing parameters for manufacturing of an optical fiber by direct print additive manufacturing

| Process parameter or variable | Parameter |
| --- | --- |
| Micro-dispensing volume | 10-cc |
| Micro-dispensing pressure | 6 psi |
| UV curing time | 7 minutes |
| UV curing wavelength | 365 nm |
| UV curing power | 21,700 mW/cm2 |
| FDM nozzle diameter | 50-micron Zirconia |
| FDM nozzle temperature | 260° C. |
| FDM nozzle speed | 0.04 mm/s |
| FDM nozzle traverse speed | 14 mm/s |
| FDM bed temperature | 90° C. |
| Laser wavelength | 355 nm |
| Laser power | 1.5 mW |
| Laser repetition rate | 50 kHz |
| Laser speed | 50 mm/s |
| Laser passes | 2 |

A 125 µm sheet of Kapton is placed on a 304 stainless sheet and secured with Kapton tape. The micro-dispensed cladding material is a UV-curable optical adhesive blend of aliphatic urethane acrylate and acrylate monomer cladding material (Norland 1369 optical adhesive) and is about 100-µm thick and 5 cm long in these experiments and is micro-dispensed onto a 125 µm thick polyimide film (Kapton, poly (4,4'-oxydiphenylene-pyromellitimide). The cladding material was cured with a BLAK-Ray Long Wave Ultraviolet Lamp, Model B 100 AP/R. Depending on the three-dimensional shape required, several layers of cladding may be micro-dispensed and cured. A thin layer of liquid ABS material is applied to the surface of the Kapton under the start and finish of the FDM printed FDM fiber and allowed to dry fully. The liquid ABS is a mixture of 5 g of ABS that is allowed to dissolve in 50 mL of acetone for 8 hours. This liquid ABS is manually applied to the Kapton. This thin ABS layer acts as an adhesive and allows the start of the PMMA to bond to the Kapton substrate.

PMMA filaments were used for the fibers (Treed, part number HIRMA) and were dried at 94° C. for 3 hours before the extrusion process in a Fisher Scientific Isotemp Vacuum Oven Model 280A. A 2 cm length of PMMA fiber was then embedded into the cladding material so that it has a uniform thickness of cladding around the 77-µm fiber. The fiber is embedded into the cladding by inserting the hot nozzle into the cladding and traversing the nozzle through the cladding material. The cladding material melts and allows the fiber to be extruded inside the cladding and then reflows back over the fiber to produce and embedded fiber. The glass transition (Tg) and melting temperature (Tm), as well as the kinetics of crystallization of the PMMA were determined using differential scanning colorimetry (DSC). All the DSC experiments were performed at a ramp rate of 10° C. min$^{-1}$ under nitrogen flow with an approximate sample weight of 10 mg. The cladding and core materials are commercial materials and were chosen because they are currently used in the production of plastic optical fiber systems and have been through manufacturer test programs to ensure that they are not affected by temperature, humidity, or other environmental issues.

Figure 23:
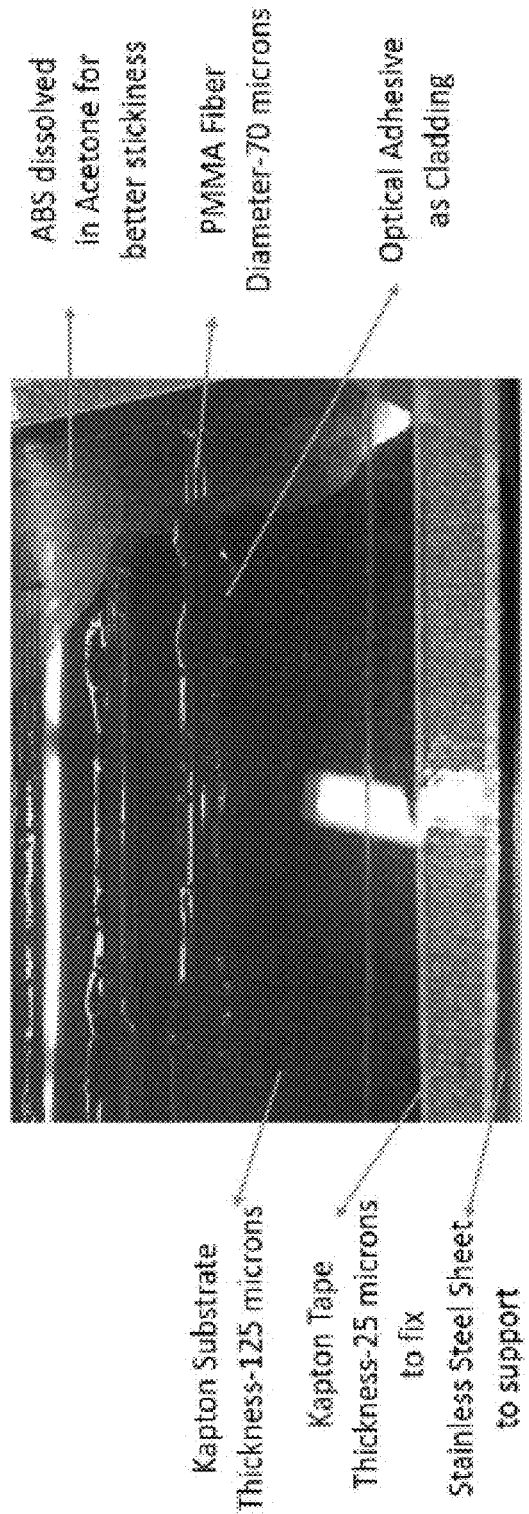
FIG. 23 is an image of printed fibers inside cladding on the flexible substrate before laser cutting.

After the fused deposition modeling process, the sample becomes layered in form, comprised of an aluminum flat plate at the bottom, the flexible substrate (Kapton) fixed around four edges by one side adhesive Kapton on the plate, the Norland optical adhesive micro-dispensed on the flexible substrate, and PMMA fiber as the core material printed into the optical adhesive but also covered by it because of reflowing during the temperature drop period. (see FIG. 23)

The preparation of the fiber end facets is critical to reduce the connector loses to optical components. The core fiber needs to be extremely flat and smooth in cross-section at the two ends. The LE-DPAM process integrates a subtractive picosecond laser at 355 nm on the same micro-positioning platform. While the inventors were able to process end facets, the surface roughness with a 355 nm laser is not smooth enough for proper connections. A 193 nm laser is the suggested wavelength for laser ablation of PMMA and is investigated. (Lévesque, L. & Jdanov, V. Optical fiber cleaved at an angle by CO2 laser ablation: Application to micromachining. *Opt. Laser Technol.* 42, 1080-1083 (2010); Gedvilas, M. & Raciukaitis, G. Investigation of UV picosecond laser ablation of polymers. in *Workshop on Laser Applications in Europe* (eds. Gries, W. & Pearsall, T. P.) vol. 6157 61570T (SPIE, 2005); Cheng, J. Y., Wei, C. W., Hsu, K. H. & Young, T. H. Direct-write laser micromachining and universal surface modification of PMMA for device development. *Sensors Actuators, B Chem.* 99, 186-196 (2004)).

Due to these high roughness measurements on initial samples, for these experiments, the end facets were hand polished. The end facets were prepared using a 355 nm picosecond laser to ablate the PMMA material. Surface roughness was measured using an image processing software applied to SEM images. A 250 nm surface roughness is measured which is more than the 63.8 nm required for optimum transmission. (Wolfer, T., Bollgruen, P., Mager, D., Overmeyer, L. & Korvink, J. G. Printing and preparation of integrated optical waveguides for optronic sensor networks. *Mechatronics* 34, 119-127 (2016)). Typical connector losses of 2-3 dB are expected based on surface roughness measurements. The inventors optimize the picosecond laser process to automatically finish the end facets to a higher standard to reduce transmission losses associated with excess surface roughness with a 193 nm laser.

Material and Device Characterization

Optical microscopy was performed using a Leitz Brand 15G optical microscope. Because the fiber diameter is less than 100-μm and the surface roughness feature size is less than 200 nm scanning electron microscopy (SEM) was used to evaluate surface roughness on the samples (focused ion beam (FIB) Quanta 3D Dual Beam Imaging System). Due to the non-conductive nature of PMMA, the SEM was used in low pressure SEM mode and operating with an acceleration voltage of 30 kV and a pressure of 0.56 Torr. The lower pressure SEM images were then used to determine the surface roughness of the fibers using ImageJ Analyze_Stripes. Analyze_Stripes is a Fiji (or ImageJ) macro designed to measure the width, edge roughness, and orientation angle of edges.

Transmission Testing Procedure

To evaluate the optical transmission capability of the fibers, two different lasers were used in the test program. Optical wavelength lasers were used for the experiments due to ease of use and lab safety. A 1.5 mW Melles Griot 05-LHR-911 laser at 632.8 nm wavelength was used. Power was reduced to 1 mW for the experiments. An LWD M SPLAN50 0.60 infinity/0 f=180 objective lens was used to focus light on the end facet of the fiber. A pinhole was used to eliminate stray light from the setup. A beam splitter and reflected light were used to provide imaging to a CCD camera that allowed us to image the end facet of the fiber with the laser for alignment. Power measurements were made with a Thorlabs USB Power Meter (PM16-120).

Modeling and Simulation

The optical performance of the devices was simulated using the commercially available FEA simulation tool, COMSOL Multiphysics 5.3 with the Ray Tracing plugin module. The mechanical performance of the devices was simulated using the commercially available FEA simulation tool ANSYS 19.2.

Differences in Printing on a Solid Surface Versus a Flexible Substrate

TABLE 5

Specifications Comparison

| | Solid Surface | Flexible Substrate |
| --- | --- | --- |
| Extrude Temp | 266° C. | 266° C. |
| Table Temp | 90° C. | 90° C. |
| Extrude Speed | 0.04 mm/s | 0.04 mm/s |
| Traverse Speed | 14 mm/s | 14 mm/s |
| Support Structure | NA | Metal sheet |
| Additional Procedure | NA | ABS liquid material |

Printing on the flexible substrate requires a metal sheet as an extra support structure. Unlike solid surface, the flexible substrate has relatively severe thermal deformation which will bend along its texture when being heated. The support structure is introduced to offer substrate stability during the fabrication at a higher temperature. Considering the heat transfer and flatness requirements, the inventors used the aluminum flat sheet from McMASTER-CARR. (Lowest thickness 0.25")

The metal sheet was placed on the table with the Kapton substrate being positioned on the metal sheet. The heater was turned on and allowed to heat both the metal sheet and the substrate. The substrate curved during this period due to a lack of fixation. When the temperature reaches the setpoint, another type of Kapton tape having an adhesive that can be utilized at high temperatures up to 300° C., was used to mount the four edges of the substrate one by one. Wipes are used to eliminate the air between sheet and substrate to achieve the best flatness.

This additional procedure is required to ensure printing on the flexible substrate. ABS was used because it exhibits stickiness with PMMA, the core material. By contrast, the Kapton substrate does not stick well with PMMA which can be solved by increasing the table temperature, however temperatures higher than 95° C. destroys the optical adhesive. In order to keep the PMMA on the substrate, 5 g of ABS was dissolved in 50 mL of acetone ("ABS liquid material") for 8 hours and applied to the surface of the substrate under the start and finish of the FDM printed fiber to act as an adhesive to bond the PMMA to the substrate. This additional step was used after curing the optical adhesive previously micro-dispensed for the cladding.

CONCLUSION

The inventors have developed a new additive manufacturing process to print optical interconnects on flexible substrates. 2D and 3D optical interconnects of 75-micron in PMMA were printed on the flexible substrate Kapton for the first time to fabricate the first ever 3D optical interconnect on a flexible substrate. The performance of the 2D and 3D interconnects were characterized in transmission and bending tests. The 3D interconnect was demonstrated to reduce transmission loss by 3 dB/cm relative to current technology which uses mirrors and other devices, through a simpler design and manufacturing process.

The inventors have fabricated optical fibers coated by cladding material on a flexible surface using an additive manufacturing method which includes fused deposition modeling and micro-dispensing. Direct printing PMMA fiber inside optical adhesive was achieved. This is the first time that laser cutting has been used for PMMA fiber end facets machining.

Laser cutting at different power outputs from 100 mW to 1500 mW and the number of cuts from 1 to 3 was conducted and the low vacuum SEM was used for characterizing the end facets. Using ImageJ the flatness of all the surfaces was compared. The optimum combination of laser cut times and power output was found for PMMA fiber cleavage to be 1400 mW and 2 times.

By designing and constructing the transmission test circuit, the transmission ability of the optical fiber was measured at different angles from 0 degrees to 90 degrees which represents the range of bend radii from infinity to 26 mm. The data indicate that a critical bend radius within the range from 30 mm to 80 mmm, in which loss stays almost as low as the straight status at 0.4 to 0.8 dB/cm when higher than this critical point, but rapidly increases 4 to 8 times reaching 2.5 to 3.2 dB/cm when bend radius goes lower than that point.

The inventors demonstrate negligible changes in transmission losses through substrate bending at moderate bend radii down to about 20 mm. The results demonstrate how flexible optoelectronic devices can be produced using additive manufacturing tools. Furthermore, a type of shape deposition manufacturing, laser enhanced-direct write additive manufacturing system of micro-dispensing, fused deposition modeling, and laser subtraction has the unique ability to produce flexible optoelectronics in a single automated process. This new flexible contact printing methodology, additive manufacturing of flexible optoelectronics method will be the starting point in the development of more sophisticated devices.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A polymer optical waveguide comprising:
   a cladding layer wherein the cladding layer comprises an ultraviolet light (UV) curable optical adhesive;
   a core embedded in the cladding layer wherein the core comprises a polymer having a higher refractive index than the cladding layer wherein the core has a surface variation of less than 1 micron; and
   finished end facets having a low root mean square (RMS) surface roughness smaller than a tenth of transmitted wavelength (k/10) to pressure wave front geometry;
   wherein the polymer optical waveguide is formed by a process comprising
   micro-dispensing the ultraviolet light (UV) curable optical adhesive onto a substrate to form the cladding;
   curing the cladding with UV light;
   using a fused deposition modeling additive manufacturing process to extrude a filament of a polymer into a center of the cladding to create the core embedded within the cladding; and
   using a subtractive laser process to finish the end facets of the polymer optical waveguide.

2. The waveguide of claim 1, wherein the optical adhesive is selected from the group consisting of urethanes, polyurethanes, acrylics, silicones, epoxies, cyanoacrylates, fluorinated polymers, and combinations thereof.

3. The waveguide of claim 1, wherein the polymer of the core is a thermoplastic selected from the group consisting of acrylics such as poly(methyl methacrylate) (PMMA), synthetic resins, styrene copolymers such as polystyrene, transparent plastics such as polycarbonate and poly(methyl-1-pentene), cyclo olefin polymers (COP), cyclic olefin copolymer, amorphous fluoropolymers such as (poly(perfluoro-butenylvinyl ether) and cyclic transparent optical polymer (CYTOP™) and combinations thereof.

4. The waveguide of claim 1, wherein the optical waveguide has a high delta n of at least 0.123.

5. The waveguide of claim 1, wherein the optical waveguide continues to transmit light effectively at a tight bend radius of up to 3 mm.

6. The waveguide of claim 1, wherein the optical waveguide uses a low wavelength of light between about 520 nm to 1550 nm.

7. The waveguide of claim 1, wherein the substrate is a flexible substrate, a printed circuit board, or a guided channel base.

8. The waveguide of claim 7, wherein the substrate is a printed circuit board.

9. The waveguide of claim 7, wherein the substrate is a flexible substrate that is positioned on a flat support structure.

10. The waveguide of claim 9, wherein a thermoplastic adhesive material is used to attach the filament of the polymer to the flexible substrate prior to the fused deposition modeling additive manufacturing process.

11. The waveguide of claim 1, wherein thickness of the cladding is at least 10% of core diameter.

12. The waveguide of claim 1, wherein the core has a surface variation of less than 500 nm.

13. The waveguide of claim 1, wherein the end facets are flat and smooth.

14. The waveguide of claim 1, wherein the end facets are aligned perpendicularly to incoming light rays.

* * * * *